United States Patent
Liu et al.

(10) Patent No.: US 11,570,354 B2
(45) Date of Patent: Jan. 31, 2023

(54) DISPLAY ASSISTANT DEVICE HAVING A MONITORING MODE AND AN ASSISTANT MODE

(71) Applicant: Google LLC, Mountain View, CA (US)

(72) Inventors: Michael Yang Liu, Santa Clara, CA (US); Jeffrey Ching Wang, San Francisco, CA (US); Mohamed Mohy-Eldeen Abdelgany, San Jose, CA (US); John Jordan Nold, Longmont, CO (US); George Alban Heitz, III, Mountain View, CA (US); Siddarth Raghunathan, Millbrae, CA (US); Shayan Sayadi, San Francisco, CA (US); Scott Mullins, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/283,202

(22) PCT Filed: Apr. 26, 2019

(86) PCT No.: PCT/US2019/029264
§ 371 (c)(1),
(2) Date: Apr. 6, 2021

(87) PCT Pub. No.: WO2020/076365
PCT Pub. Date: Apr. 16, 2020

(65) Prior Publication Data
US 2021/0329165 A1 Oct. 21, 2021

Related U.S. Application Data

(63) Continuation of application No. PCT/US2018/064449, filed on Dec. 7, 2018, which is
(Continued)

(51) Int. Cl.
*H04N 5/228* (2006.01)
*H04N 5/232* (2006.01)
(Continued)

(52) U.S. Cl.
CPC ....... *H04N 5/23219* (2013.01); *G06F 1/1605* (2013.01); *G06F 21/31* (2013.01);
(Continued)

(58) Field of Classification Search
CPC ........... H04N 5/23219; H04N 5/23222; H04N 5/23296; H04N 7/142; H04N 5/247;
(Continued)

(56) References Cited

U.S. PATENT DOCUMENTS

2005/0267605 A1 12/2005 Lee et al.
2009/0213264 A1* 8/2009 Kim ...................... H04N 7/142
348/374
(Continued)

OTHER PUBLICATIONS

Response to Communication Pursuant to Rules 161(1) and 162 EPC dated Apr. 16, 2021, from counterpart European Application No. 19730232.6, filed Oct. 6, 2021, 12 pp.
(Continued)

*Primary Examiner* — Usman A Khan
(74) *Attorney, Agent, or Firm* — Kilpatrick Townsend & Stockton LLP

(57) ABSTRACT

A display assistant device comprises a display, a camera, a speaker, microphones, a processor and memory. The memory stores programs comprising instructions that, when executed by the processor, enable a plurality of modes of the display assistant device. The modes include a monitoring mode and an assistant mode. In the monitoring mode, the device is configured to perform a remote monitoring function in which first video captured by the camera is streamed to a remote server system for monitoring uses. The moni-
(Continued)

toring uses include transmission of the first video to remote client devices authorized to access the first video. In the assistant mode, the device is configured to perform a second plurality of functions that excludes the monitoring function and includes a video communication function in which second video captured by the camera is transmitted to second devices participating in a video communication with a first user of the device.

20 Claims, 20 Drawing Sheets

Related U.S. Application Data a continuation of application No. PCT/US2018/054861, filed on Oct. 8, 2018.

(60) Provisional application No. 62/743,464, filed on Oct. 9, 2018, provisional application No. 62/742,888, filed on Oct. 8, 2018, provisional application No. 62/742,892, filed on Oct. 8, 2018.

(51) Int. Cl.
| | |
|---|---|
| *G06F 1/16* | (2006.01) |
| *G06F 21/31* | (2013.01) |
| *G06F 21/83* | (2013.01) |
| *H04N 7/14* | (2006.01) |
| *G06V 20/40* | (2022.01) |

(52) U.S. Cl.
CPC .............. *G06F 21/83* (2013.01); *G06V 20/40* (2022.01); *H04N 5/23222* (2013.01); *H04N 5/23296* (2013.01); *H04N 7/142* (2013.01); *G06V 20/44* (2022.01)

(58) Field of Classification Search
CPC ............... H04N 7/14; H04N 21/43615; H04N 5/23206; H04N 7/15; H04N 21/4223; G06F 1/1605; G06F 21/31; G06F 21/83; G06F 2200/1631; G06F 3/167; G06F 21/6245; G06F 1/1656; G06F 1/16; G06F 1/1637; G06F 1/1658; G06F 1/1671; G06F 1/1688; G06F 1/203; G06F 21/629; G06F 3/162; G06V 20/40; G06V 20/44; H04R 2499/15; H04R 1/02; H04R 1/345; H04R 27/00; H04R 2227/003; H04R 2227/005; H04R 1/026; H04R 1/021; H04R 1/023; H04R 1/34; H04L 63/0861; H04L 63/101; G08C 23/02; G10L 15/22
USPC ..................................................... 348/222.1
See application file for complete search history.

(56) References Cited

U.S. PATENT DOCUMENTS

| | | | |
|---|---|---|---|
| 2016/0364114 A1* | 12/2016 | Von Dehsen | ....... G06F 3/04817 |
| 2017/0038949 A1* | 2/2017 | Chen | ........................ G06T 11/60 |
| 2017/0094372 A1* | 3/2017 | Moon | ................ H04N 21/4405 |
| 2017/0237930 A1* | 8/2017 | Kim | ................. H04N 21/47217 |
| | | | 348/554 |
| 2017/0357876 A1* | 12/2017 | Rothschild | ............ G06F 16/583 |

OTHER PUBLICATIONS

"Authorization," retrieved from https:jjen.wikipedia.orgjwjindex. php?title=Authorization&oldid=860699704, on Jul. 24, 2019, 3 pp.
"Light-Emitting Diode," retrieved from https:jjen.wikipedia. orgjwjindex.php?title=Light-emitting_diode&oldid=862643219#Indicators_and_signs, on Sep. 19, 2019, 36 pp.
International Search Report and Written Opinion of International Application No. PCT/US2019/029264, dated Oct. 19, 2019, 22 pp.
International Preliminary Report on Patentability from International Application No. PCT/US2019/029264, dated Apr. 22, 2021, 17 pp.

* cited by examiner

DISPLAY ASSISTANT DEVICE HAVING A MONITORING MODE AND AN ASSISTANT MODE

CROSS-REFERENCES TO RELATED APPLICATIONS

This application claims the benefit of International Patent Application No. PCT/US2019/029264, filed Apr. 26, 2019, which is a continuation of International Patent Application No. PCT/US2018/064449, filed Dec. 7, 2018, which claims the benefit of U.S. Provisional Application No. 62/743,464, filed Oct. 9, 2018, U.S. Provisional Application No. 62/742,888, filed Oct. 8, 2018, and U.S. Provisional Application No. 62/742,892, filed Oct. 8, 2018, each of which is hereby incorporated by reference in its entirety for all purposes. International Patent Application No. PCT/US2019/029264 is also a continuation of International Patent Application No. PCT/US2018/054861, filed Oct. 8, 2018, which is hereby incorporated by reference in its entirety for all purposes.

TECHNICAL FIELD

This application relates generally to electronic devices, including but not limited to a voice-activated display assistant device that enhances assistant-based consumption uses and provides peace of mind with home monitoring features.

BACKGROUND

Electronic devices integrated with cameras and microphones are extraordinarily popular. These devices are also referred to as smart home devices or smart assistant devices. They are widely used to capture and save an ever expanding collection of media files such as digital photos. They are also used to collect voice inputs from users and implement different voice-activated functions according to the voice inputs. For example, many state-of-the-art mobile devices include a voice assistant system (e.g., GOOGLE ASSISTANT) that is configured to use voice inputs to initiate a phone call, conduct a restaurant search, start routing on a map, create calendar events, add a post to a social network, recognize a song and complete many other tasks. These electronic devices are also used to perform functions such as voice calls and videoconferencing.

Despite the prevalence of electronic devices for assistant-based consumption uses, there remains a need for devices that provide users with peace of mind that all is well with their loved ones and property while they are away. A recent study found that out of 5600 survey correspondents, four-in-ten consumers who are at least somewhat interested in smart home devices ranked making their home more secure as the top reason they would be interested in a smart home device.

SUMMARY

The present disclosure addresses the above-identified shortcomings by providing a display assistant device that delivers a home monitoring service in addition to its core consumption uses for entertainment, family connection, and productivity. The display assistant device includes a built-in camera that is configured to allow users to keep track of what is happening at home, thus providing users with peace of mind. The display assistant device further includes affordances that identify its operation mode to users (e.g., account owners, family members, and visitors) as they interact with the device.

In accordance with some implementations, a display assistant device comprises a display, a camera, a speaker, one or more microphones, and a processing unit. The display has a screen side (e.g., front side) and a rear side. In some implementations, the camera is located on the screen side, with a field of view facing towards a front side of the display assistant device. In some implementations, the display assistant device includes multiple cameras each having a respective field of view and positioned at both the front and rear sides. The display assistant device comprises memory storing one or more programs. The one or more programs comprise instructions that, when executed by the processing unit, enable a plurality of modes of the display assistant device. The plurality of modes includes a monitoring mode. In the monitoring mode, the display assistant device is configured to perform a remote monitoring function in which first video (continuously) captured by the camera is streamed to a remote server system for monitoring uses. The monitoring uses include transmission of the first video to one or more remote client devices authorized to access the first video. In some implementations, the remote server is associated with a cloud video processing system or home security monitoring system. In some implementations, the remote monitoring function is performed without interaction with a user of the display assistant device. In other words, there may not be anyone who is using the device while it is in the monitoring mode. The plurality of modes includes an assistant mode. In the assistant mode, the display assistant device is configured to perform a second plurality of functions. The second plurality of functions excludes the monitoring function and includes a video communication function (e.g., videoconferencing function) in which second video captured by the camera is transmitted (e.g., via one or more private communication channels) to one or more second devices participating in a video communication with a first user of the display assistant device. The one or more second devices are distinct from the one or more remote client devices.

In some implementations, the display assistant device is configured to be communicatively connected to the Internet. In some implementations, the display assistant device is linked to a first client device. The display assistant device is registered to a first user account and the first client device is associated with the first user account. In some implementations, the display assistant device is configured to perform the video communication function (e.g., videoconferencing and video chats) in the monitoring mode. In some implementations, the display assistant device is configured to perform a face recognition (e.g., face matching) function in the monitoring mode. In some implementations, the display assistant device is further configured to curate content for the user that has been identified based on the face match in the monitoring mode.

In some implementations, the display assistant device is configured to perform the face recognition (e.g., face matching) function in the assistant mode. In some implementations, the display assistant device is further configured to curate content for the user that has been identified based on the face match in the assistant mode.

In one aspect, some implementations include a method performed at a display assistant device. In some implementations, the display assistant device is located in a premises. The display assistant device includes a display, a camera, a speaker, one or more microphones, a processing unit, and memory. The memory stores one or more programs that, when executed by the processing unit, enable a plurality of modes of the display assistant device. The plurality of modes includes a monitoring mode and an assistant mode. The method comprises, in the monitoring mode: performing a first operation associated with a first device function. In some implementations, the first device function is a remote monitoring function. The first operation comprises: continuously capturing first video (e.g., of the premises) using the camera; and transmitting (e.g., continuously or simultaneously transmitting) the first video to a remote server system (e.g., for monitoring uses). While (e.g., during) performing the first operation, the display assistant device receives a first user request associated with a second device function. In some implementations, the second device function is a video communication function (e.g., a videoconference function or a Duo call). In response to the first user request, the display assistant device pauses the first operation and performs a second operation associated with the second device function. The second operation comprises: continuously capturing second video using the camera; and transmitting the second video to one or more second users participating in a video communication with a first user of the display assistant device.

In some implementations, a display assistant device is configured to perform any of the methods described herein.

In some implementations, a computing system is configured to perform any of the methods described herein.

In some implementations, a non-transitory computer-readable storage medium stores one or more programs. The one or more programs comprise instructions, which when executed by a display assistant device, cause the display assistant device to perform any of the methods described herein.

In some implementations, a non-transitory computer-readable storage medium stores one or more programs. The one or more programs comprise instructions, which when executed by a computer system, cause the computer system to perform any of the methods described herein.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1A:
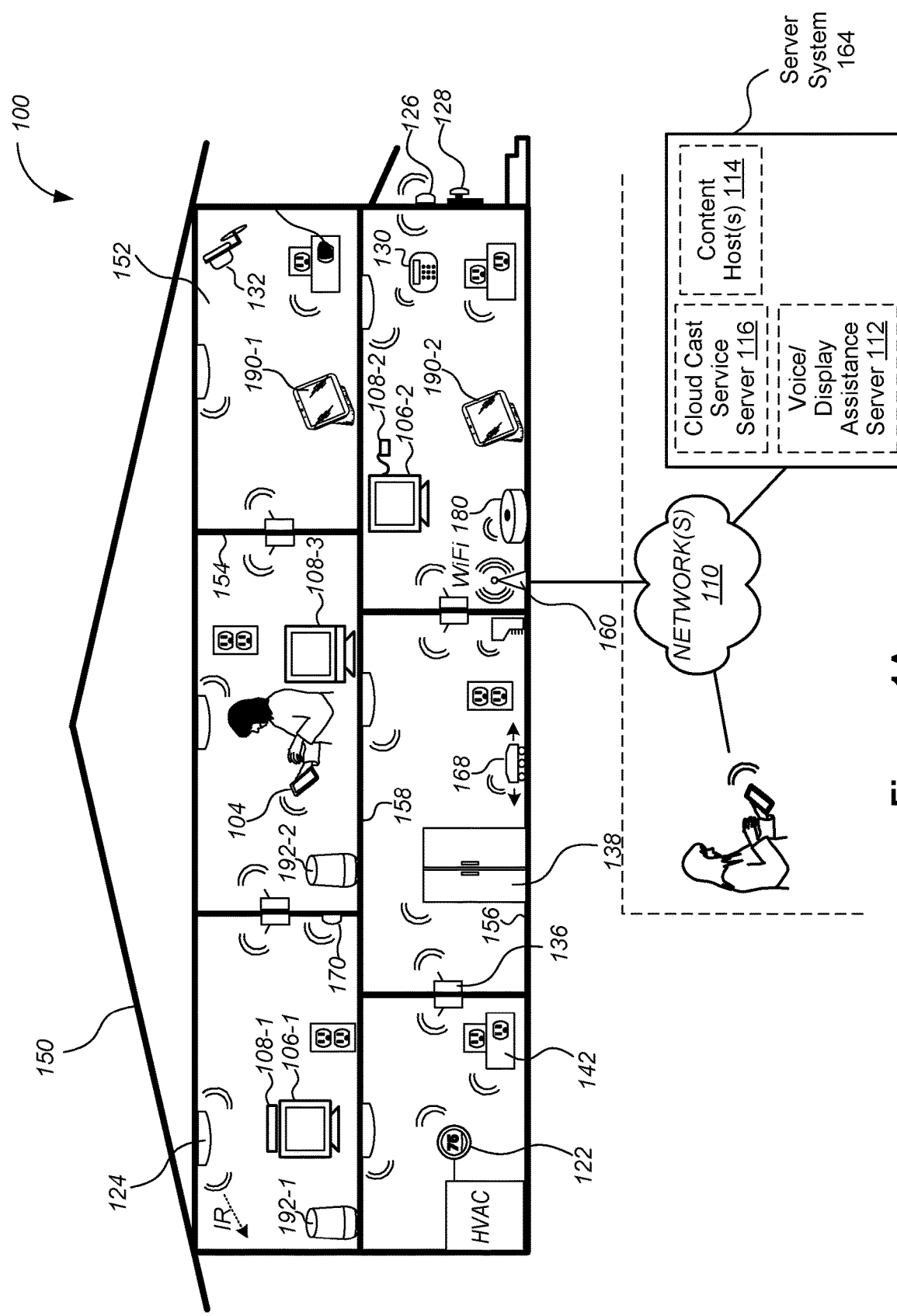
FIG. 1A is an example smart home environment in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Display assistant devices integrated with microphones and cameras can be used to collect audio and visual inputs from users and implement voice-activated functions according to voice inputs. Some electronic devices include a voice assistant feature that is configured to use audio inputs to perform many tasks. The functionality of these display assistant devices can be further expanded to home security and remote monitoring, to provide peace of mind to users.

For example, consider a use case in which a first user purchases a voice-activated display assistant device with video monitoring capabilities. While commissioning (e.g., provisioning) the display assistant device for use in her smart home environment (e.g., using a smart home application installed on her mobile device), the first user receives a welcome message on the smart home application asking if she would like to configure the display assistant device for smart home monitoring. The first user accepts the offer and completes the provisioning process, during which the display assistant device is configured to perform video and audio monitoring functions in addition to a range of voice and display assistant functions. In some implementations, during the commissioning process, the voice-activated display assistant device shows a live view of the camera of the display assistant device to help with ideal placement of the device in the smart home environment. Thereafter, the first user is able to move about the room where the display assistant device is located while issuing multiple verbal requests to the display assistant device. The assistant device receives the verbal requests and presents responses, which include visual and/or audio information for the first user to view and/or listen to. Later, when the first user is at work, having configured the display assistant device for smart home monitoring, she is able to see a live video steam of the room, captured using the camera of the display assistant device, using her smart home application. The first user is also able to receive notifications alerting her to unusual activity or unfamiliar faces in the room captured by the camera and/or microphones of the display assistant device. In response to the notifications, the first user is able to check out a live view of the room and respond accordingly via her smart home application. The first user can also set up "family" member accounts, which in turn enable these "family" account members to see live video streams of the room using their own smart home applications and/or to receive notifications for unusual activity.

The use case described above mentions particular modalities through which the first user interacts with the display assistant device (e.g., voice inputs, or inputs received from a smart home application) and receives information from the display assistant device (e.g., information presented via the smart home application or via audio or video playback from the display assistant device). However, in some implementations the display assistant device is responsive to a wider range of inputs, including one or more of: voice inputs, inputs received from a smart home application, touch inputs entered on a touch sensitive display of the display assistant device, and/or air gestures performed in proximity to the display assistant device that are captured by its camera or a sensor included in the display assistant device, such as a radar transceiver or PIR detector.

In some implementations, a user is provided with various subscription options when provisioning the display assistant device. The subscription options include a first option (e.g., a free tier or a lower cost tier) that provides one or more of: a "Live View" capability (e.g., the ability to review via a smart home app or browser, in at least near real time, video from the camera); a "Talk & Listen" capability (e.g., the ability to speak and listen via a smart home app or browser, in real time, to an individual in proximity to the display assistant device); basic event notifications (e.g., notifications for motion events and/or sound events and/or person events captured by the camera and/or microphone of the display assistant device); a display assistant device camera history (e.g., a one-hour, three-hour, or five-hour history of camera recordings); and monitoring settings including a Home/Away Assist setting (e.g., a setting in which the display assistant device is configured to turn on its camera and enter monitoring mode when the user is "away" and to turn off its camera and exit monitoring mode when the user is "home") and Camera Scheduling (a setting in which the user is able to define a schedule for turning the camera and monitoring mode on and off). Further details regarding Live View and Talk & Listen operations are described below in the section entitled "Device Operation Modes." In some implementations, the subscription options include a second option (e.g., a paid tier or a higher cost tier) that includes all the features of the first option and additional features. In some implementations, the additional features included in second option include intelligent event notifications, such as Familiar Face, Activity Zone, Dog Barking, Person Talking, Broken Glass and Baby Crying alerts; Continuous Video History; Time Lapse Video Summaries; and/or Close-Up Tracking Views of events of interest. Details of intelligent event notifications are described in U.S. patent application Ser. No. 15/207,458, filed Jul. 11, 2016, titled "Methods and Systems for Providing Event Alerts," which is incorporated by reference herein in its entirety.

FIG. 1A is an example smart home environment 100 in accordance with some implementations. The smart home environment 100 includes a structure 150 (e.g., a house, office building, garage, or mobile home) with various integrated devices (also referred to herein as "connected" or "smart" devices). It will be appreciated that smart devices may also be integrated into a smart home environment 100 that does not include an entire structure 150, such as an apartment, condominium, or office space. In some implementations, the smart devices include one or more of: personal client devices 104 (e.g., tablets, laptops or mobile phones), display devices 106, media casting or streaming devices 108, thermostats 122, home protection devices 124 (e.g., smoke, fire and carbon dioxide detector), home security devices (e.g., motion detectors, window and door sensors and alarms), including connected doorbell/cameras 126, connected locksets 128, alarm systems 130 and cameras 132, connected wall switches transponders 136, connected appliances 138, WiFi communication devices 160 (e.g., hubs, routers, extenders), connected home cleaning devices 168 (e.g., vacuum or floor cleaner), smart home communication and control hubs 180, voice assistant devices 192, and display assistant devices 190.

It is to be appreciated that the term "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, yards, parks, and more generally any living space or work space.

It is also to be appreciated that while the terms user, customer, installer, homeowner, occupant, guest, tenant, landlord, repair person, and the like may be used to refer to a person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158.

One or more media devices are disposed in the smart home environment 100 to provide users with access to media content that is stored locally or streamed from a remote content source (e.g., content host(s) 114). In some implementations, the media devices include media output devices 106, which directly output/display/play media content to an audience, and cast devices 108, which stream media content received over one or more networks to the media output devices 106. Examples of the media output devices 106 include, but are not limited to, television (TV) display devices, music players and computer monitors. Examples of the cast devices 108 include, but are not limited to, medial streaming boxes, casting devices (e.g., GOOGLE CHROMECAST devices), set-top boxes (STBs), DVD players and TV boxes.

In the example smart home environment 100, media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-2 includes a smart TV device that integrates an embedded casting unit to stream media content for display to its audience. The media output device 106-3 includes a regular TV display that is coupled to a TV box 108-3 (e.g., Google TV or Apple TV products), and such a TV box 108-3 streams media content received from a media content host server 114 and provides an access to the Internet for displaying Internet-based content on the media output device 106-3.

In addition to the media devices 106 and 108, one or more electronic devices 190 and 192 are disposed in the smart home environment 100. Electronic devices 190 are display assistant devices and electronic devices 192 are voice assistant devices. In some implementations, the display assistant device 190 is also a voice assistant device. The electronic devices 190 and 192 collect audio inputs for initiating various media play functions of the devices 190 and 192 and/or media devices 106 and 108. In some implementations, the devices 190 and 192 are configured to provide media content that is stored locally or streamed from a remote content source. In some implementations, the electronic devices 190 and 192 are voice-activated and are disposed in proximity to a media device, for example, in the same room with the cast devices 108 and the media output devices 106. Alternatively, in some implementations, a voice-activated display assistant device 190-1 is disposed in a room having one or more smart home devices but not any media device. Alternatively, in some implementations, a voice-activated electronic device 190 is disposed in a location having no networked electronic device. This allows for the devices 190 and 192 to communicate with the media devices and share content that is being displayed on one device to another device (e.g., from device 190-1 to device 190-2 and/or media devices 108).

The voice-activated electronic device 190 includes at least one microphone, a speaker, a processor and memory storing at least one program for execution by the processor. The speaker is configured to allow the electronic device 190 to deliver voice messages to a location where the electronic device 190 is located in the smart home environment 100, thereby broadcasting information related to a current media content being displayed, reporting a state of audio input processing, having a conversation with or giving instructions to a user of the electronic device 190. For instance, in some embodiments, in response to a user query the device provides audible information to the user through the speaker. As an alternative to the voice messages, visual signals could also be used to provide feedback to the user of the electronic device 190 concerning the state of audio input processing, such as a notification displayed on the device.

In accordance with some implementations, an electronic device 190 is a voice interface device that is network-connected to provide voice recognition functions with the aid of a server system 164. In some implementations, the server system 164 includes a cloud cast service server 116 and/or a voice/display assistance server 112. For example, in some implementations an electronic device 190 includes a smart speaker that provides music (e.g., audio for video content being displayed on the device 190 or on a display device 106) to a user and allows eyes-free and hands-free access to a voice assistant service (e.g., Google Assistant). Optionally, the electronic device 190 is a simple and low cost voice interface device, e.g., a speaker device and a display assistant device (including a display screen having no touch detection capability).

In some implementations, the voice-activated electronic devices 190 integrates a display screen in addition to the microphones, speaker, processor and memory (e.g., 190-1 and 190-2), and are referred to as "display assistant devices." The display screen is configured to provide additional visual information (e.g., media content, information pertaining to media content, etc.) in addition to audio information that can be broadcast via the speaker of the voice-activated electronic device 190. When a user is nearby and his or her line of sight is not obscured, the user may review the additional visual information directly on the display screen of the display assistant device. Optionally, the additional visual information provides feedback to the user of the electronic device 190 concerning the state of audio input processing. Optionally, the additional visual information is provided in response to the user's previous voice inputs (e.g., user queries), and may be related to the audio information broadcast by the speaker. In some implementations, the display screen of the voice-activated electronic devices 190 includes a touch display screen configured to detect touch inputs on its surface (e.g., instructions provided through the touch display screen). Alternatively, in some implementations, the display screen of the voice-activated electronic devices 190 is not a touch display screen, which is relatively expensive and can compromise the goal of offering the display assistant device 190 as a low cost user interface solution.

When voice inputs from the electronic device 190 are used to control the electronic device 190 and/or media output devices 106 via the cast devices 108, the electronic device 190 effectively enables a new level of control of cast-enabled media devices independently of whether the electronic device 190 has its own display. In an example, the electronic device 190 includes a casual enjoyment speaker with far-field voice access and functions as a voice interface device for Google Assistant. The electronic device 190 could be disposed in any room in the smart home environment 100. When multiple electronic devices 190 are distributed in multiple rooms, they become audio receivers that are synchronized to provide voice inputs from all these rooms. For instant, a first electronic device 190 may receive a user instruction that is directed towards a second electronic device 190-2 (e.g., a user instruction of "OK Google, show this photo album on the Kitchen device.").

Specifically, in some implementations, an electronic device 190 includes a WiFi speaker with a microphone that is connected to a voice-activated personal assistant service (e.g., Google Assistant). A user could issue a media play request via the microphone of electronic device 190, and ask the personal assistant service to play media content on the electronic device 190 itself and/or on another connected media output device 106. For example, the user could issue a media play request by saying to the Wi-Fi speaker "OK Google, Play cat videos on my Living room TV." The personal assistant service then fulfils the media play request by playing the requested media content on the requested device using a default or designated media application.

A user could also make a voice request via the microphone of the electronic device 190 concerning the media content that has already been played and/or is being played on a display device. For instance, a user may instruct the device to provide information related to a current media content being displayed, such as ownership information or subject matter of the media content. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic device 190 without involving any other device having a physical user interface, and such a voice-activated electronic device 190 satisfies federal accessibility requirements for users having hearing disability. In some implementations, a user wants to take a current media session with them as they move through the house. This requires the personal assistant service to transfer the current media session from a first cast device to a second cast device that is not directly connected to the first cast device or has no knowledge of the existence of the first cast device. Subsequent to the media content transfer, a second output device 106 coupled to the second cast device 108 continues to play the media content previously a first output device 106 coupled to the first cast device 108 from the exact point within a photo album or a video clip where play of the media content was forgone on the first output device 106.

In some implementations, the display assistant device 190 includes a display screen and one-or more built in cameras. The cameras are configured to capture images and/or videos, which are then transmitted (e.g., streamed) to a server system 164 for display on client devices(s) (e.g., authorized client devices 104 and 220, FIG. 2C).

In some implementations, the voice-activated electronic devices 190, smart home devices could also be mounted on, integrated with and/or supported by a wall 154, floor 156 or ceiling 158 of the smart home environment 100 (which is also broadly called as a smart home environment in view of the existence of the smart home devices). The integrated smart home devices include intelligent, multi-sensing, network-connected devices that integrate seamlessly with each other in a smart home network (e.g., 102 FIG. 1B) and/or with a central server or a cloud-computing system to provide a variety of useful smart home functions. In some implementations, a smart home device is disposed at the same location of the smart home environment 100 as a cast device 108 and/or an output device 106, and therefore, is located in proximity to or with a known distance with respect to the cast device 108 and the output device 106.

In some implementations, the smart home devices in the smart home environment 100 includes, but is not limited to, one or more intelligent, multi-sensing, network-connected camera systems 132. In some embodiments, content that is captured by the camera systems 132 is displayed on the electronic devices 190 at a request of a user (e.g., a user instruction of "OK Google, Show the baby room monitor.") and/or according to settings of the home environment 100 (e.g., a setting to display content captured by the camera systems during the evening or in response to detecting an intruder).

The smart home devices in the smart home environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, and one or more intelligent, multi-sensing, network-connected wall switches 136. In some implementations, the smart home devices in the smart home environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The smart home devices in the smart home environment 100 may additionally or alternatively include one or more other occupancy sensors (e.g., touch screens, IR sensors, ambient light sensors and motion detectors). In some implementations, the smart home devices in the smart home environment 100 include radio-frequency identification (RFID) readers (e.g., in each room 152 or a portion thereof) that determine occupancy based on RFID tags located on or embedded in occupants. For example, RFID readers may be integrated into the smart hazard detectors 104.

In some implementations, in addition to containing sensing capabilities, devices 122, 124, 126, 128, 130, 132, 136, 138, and 190 (which are collectively referred to as "the smart home devices" or "the smart home devices 120") are capable of data communications and information sharing with other smart home devices, a central server or cloud-computing system, and/or other devices (e.g., the client device 104, the cast devices 108 and the voice-activated electronic devices 190) that are network-connected. Similarly, each of the cast devices 108 and the voice-activated electronic devices 190 is also capable of data communications and information sharing with other cast devices 108, voice-activated electronic devices 190, smart home devices, a central server or cloud-computing system 164, and/or other devices (e.g., the client device 104) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the cast devices 108, the electronic devices 190 and the smart home devices serve as wireless or wired repeaters. In some implementations, a first one of and the cast devices 108 communicates with a second one of the cast devices 108 and the smart home devices 120 via a wireless router. The cast devices 108, the electronic devices 190 and the smart home devices 120 may further communicate with each other via a connection (e.g., network interface 160) to a network, such as the Internet 110.

Through the Internet 110, the cast devices 108, the electronic devices 190 and the smart home devices 120 may communicate with a server system 164 (also called a central server system and/or a cloud-computing system herein). Optionally, the server system 164 may be associated with a manufacturer, support entity, or service provider associated with the cast devices 108 and the media content displayed to the user.

In general, any of the connected electronic devices described herein can be configured with a range of capabilities for interacting with users in the environment. For example, an electronic device can be configured with one or more microphones, one or more speakers and voice-interaction capabilities in which a user interacts with the device display assistant device via voice inputs received by the microphone and audible outputs played back by the speakers to present information to users. Similarly, an electronic device can be configured with buttons, switches and/or other touch-responsive sensors (such as a touch screen, touch panel, or capacitive or resistive touch sensors) to receive user inputs, and with haptic or other tactile feedback capabilities to provide tactile outputs to users. An electronic device can also be configured with visual output capabilities, such as a display panel and/or one or more indicator lights to output information to users visually, as described in U.S. patent application Ser. No. 15/592,120, titled "LED Design Language for Visual Affordance of Voice User Interfaces," which is incorporated herein by reference. In addition, an electronic device can be configured with movement sensors that can detect movement of objects and people in proximity to the electronic device, such as a radar transceiver(s) or PIR detector(s), as described in U.S. patent application Ser. No. 15/481,289, titled "Systems, Methods, and Devices for Utilizing Radar-Based Touch Interfaces," which is incorporated herein by reference.

Inputs received by any of these sensors can be processed by the electronic device and/or by a server communicatively coupled with the electronic device (e.g., the server system 164 of FIG. 1A). In some implementations, the electronic device and/or the server processes and/or prepares a response to the user's input(s), which response is output by the electronic device via one or more of the electronic device's output capabilities. In some implementations, the electronic device outputs via one or more of the electronic device's output capabilities information that is not directly responsive to a user input, but which is transmitted to the electronic device by a second electronic device in the environment, or by a server communicatively coupled with the electronic device. This transmitted information can be of virtually any type that is displayable/playable by the output capabilities of the electronic device.

The server system 164 provides data processing for monitoring and facilitating review of events (e.g., motion, audio, security, etc.) from data captured by the smart devices 120, such as video cameras 132, smart doorbells 106, and display assistant device 190. In some implementations, the server system 164 may include a voice/display assistance server 112 that processes audio inputs collected by voice-activated electronic devices 190, one or more content hosts 104 that provide the displayed media content, and a cloud cast service server 116 creating a virtual user domain based on distributed device terminals. The server system 164 also includes a device registry for keeping a record of the distributed device terminals in the virtual user environment. Examples of the distributed device terminals include, but are not limited to the voice-activated electronic devices 190, cast devices 108, media output devices 106 and smart home devices 122-138. In some implementations, these distributed device terminals are linked to a user account (e.g., a Google user account) in the virtual user domain. In some implementations, each of these functionalities and content hosts is a distinct server within the server system 164. In some implementations, a subset of these functionalities is integrated within the server system 164.

In some implementations, the network interface 160 includes a conventional network device (e.g., a router). The smart home environment 100 of FIG. 1 further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 1B:
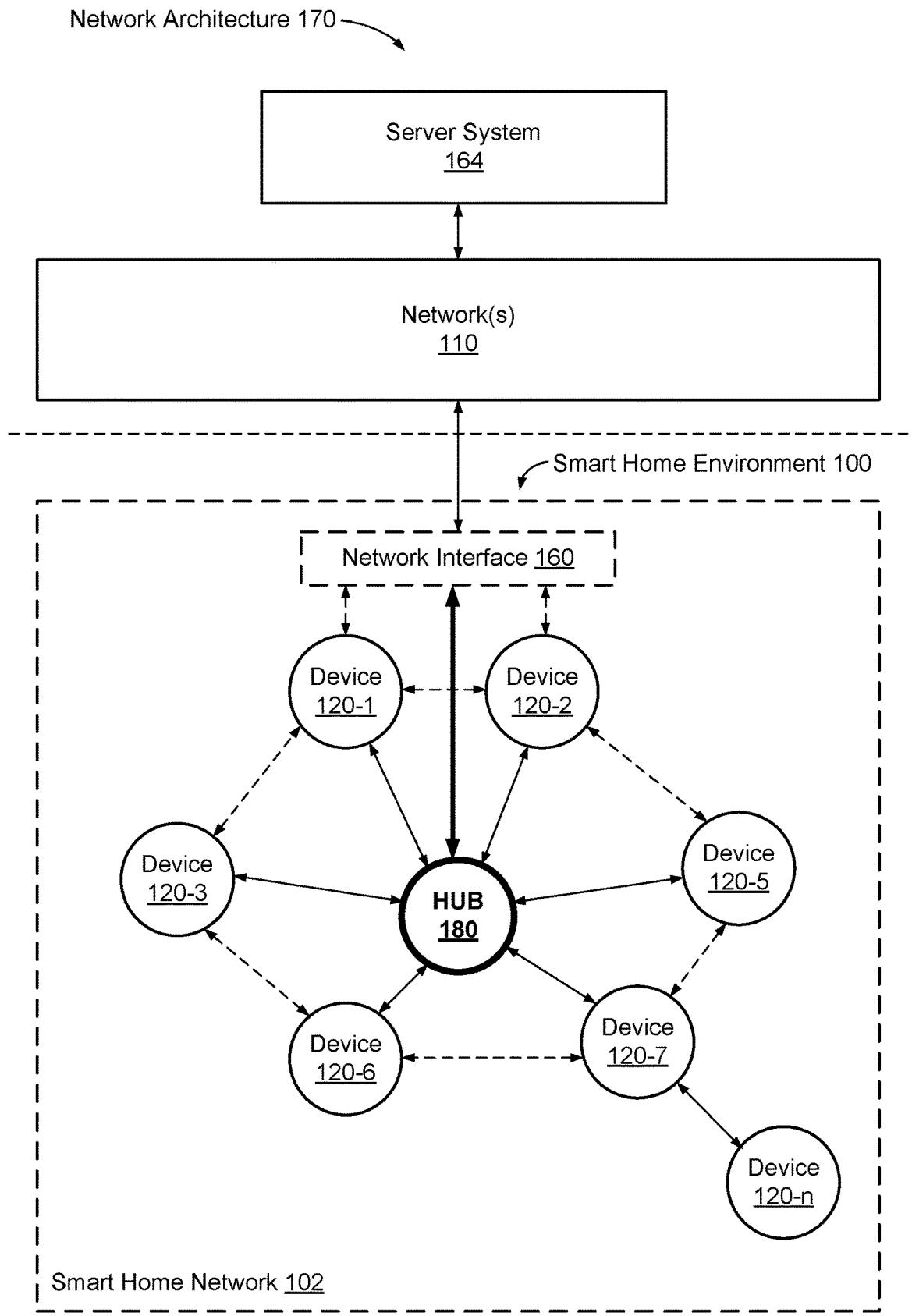
FIG. 1B is a block diagram illustrating a representative network architecture that includes a smart home network in accordance with some implementations.

FIG. 1B is a block diagram illustrating a representative network architecture 170 that includes a smart home network 102 in accordance with some implementations.

In some implementations, the integrated devices of the smart home environment 100 include intelligent, multi-sensing, network-connected devices (e.g., devices 122, 124, 126, 128, 130, 132, 136 and/or 138), herein referred to collectively as smart devices 120, that integrate seamlessly with each other in a smart home network (e.g., 102 FIG. 1B) and/or with a central server or a cloud-computing system (e.g., server system 164) to provide a variety of useful smart home functions.

In some implementations, the smart home devices 120 in the smart home environment 100 combine with the hub device 180 to create a mesh network in smart home network 102. In some implementations, one or more smart devices 120 in the smart home network 102 operate as a smart home controller. Additionally and/or alternatively, the hub device 180 operates as the smart home controller. In some implementations, a smart home controller has more computing power than other smart devices. In some implementations, a smart home controller processes inputs (e.g., from smart devices 120, electronic devices 190 (FIG. 1A), and/or server system 164) and sends commands (e.g., to smart devices 120 in the smart home network 102) to control operation of the smart home environment 100. In some implementations, some of the smart devices 120 in the smart home network 102 (e.g., in the mesh network) are "spokesman" nodes (e.g., 120-1) and others are "low-powered" nodes (e.g., 120-9). Some of the smart devices in the smart home environment 100 are battery powered, while others have a regular and reliable power source, such as by connecting to wiring (e.g., to 120 Volt line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, ZWave, 6LoWPAN, Thread, Bluetooth, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes. In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 102. In some implementations, the spokesman nodes in the smart home network 102, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-powered nodes using low-power communication protocols are able to send and/or receive messages across the entire smart home network 102, as well as over the Internet 110 to the server system 164. In some implementations, the mesh network enables the server system 164 to regularly receive data from most or all of the smart devices in the home, make inferences based on the data, facilitate state synchronization across devices within and outside of the smart home network 102, and send commands to one or more of the smart devices to perform tasks in the smart home environment.

As described, the spokesman nodes and some of the low-powered nodes are capable of "listening." Accordingly, users, other devices, and/or the server system 164 may communicate control commands to the low-powered nodes. For example, a user may use the electronic device 104 (e.g., a smart phone) to send commands over the Internet to the server system 164, which then relays the commands to one or more spokesman nodes in the smart home network 102. The spokesman nodes may use a low-power protocol to communicate the commands to the low-power nodes throughout the smart home network 102, as well as to other spokesman nodes that did not receive the commands directly from the server system 164.

In some implementations, a smart nightlight 170 (FIG. 1), which is an example of a smart device 120, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 102 as well as over the Internet 110 to the server system 164.

Other examples of low-power nodes include battery-powered versions of the smart hazard detectors 124, cameras 132, doorbells 126, and the like. These battery-powered smart devices are often located in an area without access to constant and reliable power and optionally include any number and type of sensors, such as image sensor(s), occupancy/motion sensors, ambient light sensors, ambient temperature sensors, humidity sensors, smoke/fire/heat sensors (e.g., thermal radiation sensors), carbon monoxide/dioxide sensors, and the like. Furthermore, battery-powered smart devices may send messages that correspond to each of the respective sensors to the other devices and/or the server system 164, such as by using the mesh network as described above.

Examples of spokesman nodes include line-powered smart doorbells 126, smart thermostats 122, smart wall switches 136, and smart wall plugs 142. These devices are located near, and connected to, a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 110 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 110, but also converts information received from the network interface 160 or the network(s) 110 to meet the data format requirements of the respective communication protocol associated with a targeted smart device. In some implementations, in addition to data format conversion, the hub device 180 further processes the data received from the smart devices or information received from the network interface 160 or the network(s) 110 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 2A:
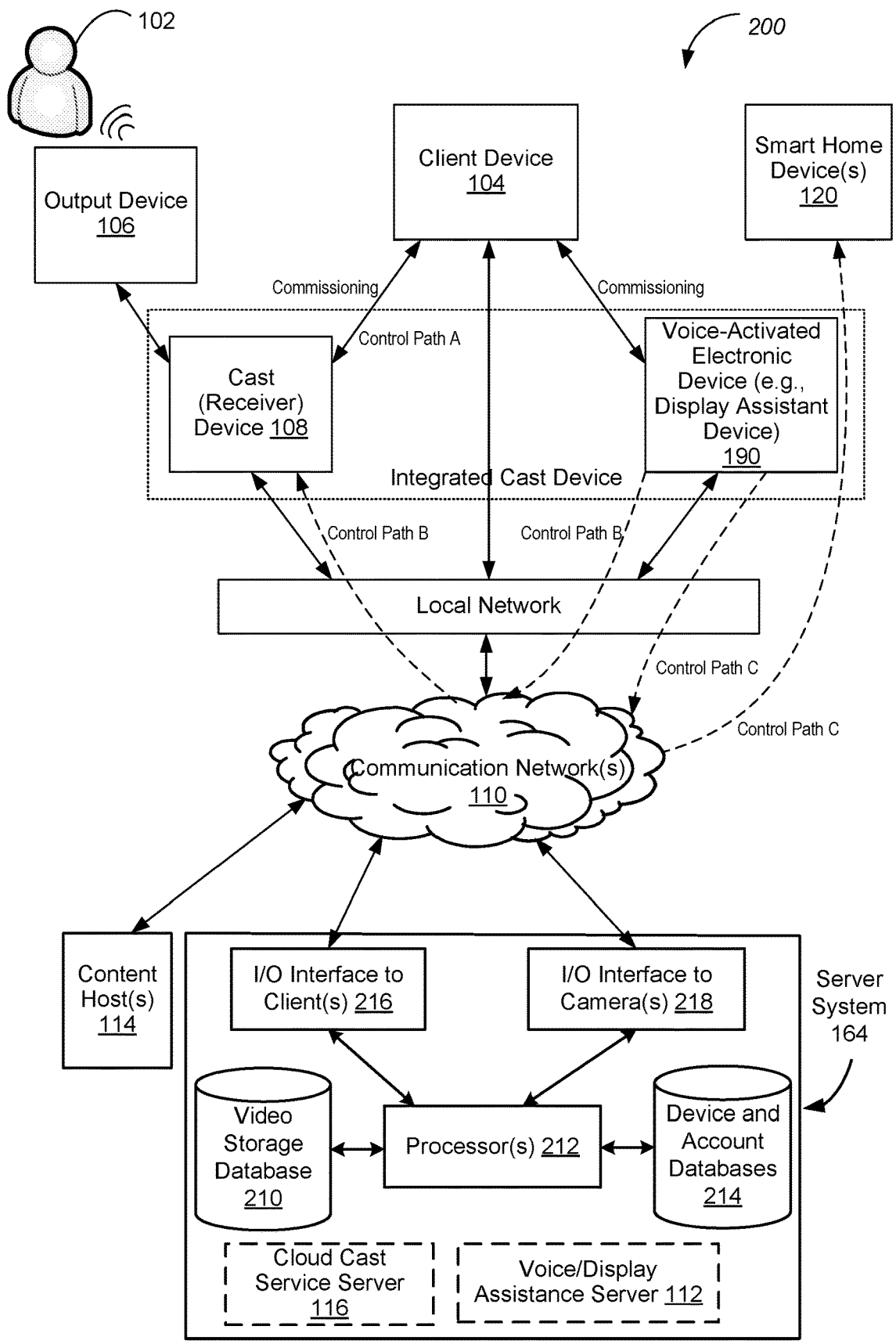
FIG. 2A is an example operating environment in which a voice-activated electronic device (e.g., a display assistant device) interacts with a cast device, a client device or a server system of a smart home environment in accordance with some implementations.

FIG. 2A is an example operating environment 200 in which a voice-activated electronic device 190 (e.g., a display assistant device) interacts with a cast device 108, a client device 104 or a server system 164 of a smart home environment 100 in accordance with some implementations. The voice-activated electronic device 190 is configured to receive audio inputs from an environment in proximity to the voice-activated electronic device 190. Optionally, the electronic device 190 stores the audio inputs and at least partially processes the audio inputs locally. Optionally, the electronic device 190 transmits the received audio inputs or the partially processed audio inputs to the server system 164 via the communication networks 110 for further processing. In some implementations, the cast device 108 is configured to obtain media content or Internet content from one or more content hosts 114 for display on an output device 106 coupled to the cast device 108. As explained above, the cast device 108 and the voice-activated electronic device 190 are linked to each other in a user domain, and more specifically, associated with each other via a user account in the user domain. Information of the cast device 108 and information of the electronic device 190 are stored in a device registry in association with the user account.

In some implementations, the cast device 108 does not include any display screen, and the voice-activated electronic device 190 includes a display assistant device that has a display screen. Both the cast device 108 and the display assistant device 190 have to rely on the client device 104 to provide a user interface during a commissioning process. Specifically, the client device 104 is installed with an application that enables a user interface to facilitate commissioning of a new cast device 108 or a new display assistant device 190 disposed in proximity to the client device 104. A user may send a request on the user interface of the client device 104 to initiate a commissioning process for the new cast device 108 or display assistant device 190 that needs to be commissioned. After receiving the commissioning request, the client device 104 establishes a short range communication link with the new cast device 108 or display assistant device 190 that needs to be commissioned. Optionally, the short range communication link is established based near field communication (NFC), Bluetooth, Bluetooth Low Energy (BLE) and the like. The client device 104 then conveys wireless configuration data associated with a wireless local area network (WLAN) to the new cast device 108 or display assistant device 190. The wireless configuration data includes at least a WLAN security code (i.e., service set identifier (SSID) password), and optionally includes an SSID, an Internet protocol (IP) address, proxy configuration and gateway configuration. After receiving the wireless configuration data via the short range communication link, the new cast device 108 or display assistant device 190 decodes and recovers the wireless configuration data, and joins the WLAN based on the wireless configuration data.

Additional user domain information is entered on the user interface displayed on the client device 104, and used to link the new cast device 108 or display assistant device 190 to an account in a user domain. Optionally, the additional user domain information is conveyed to the new cast device 108 or display assistant device 190 in conjunction with the wireless communication data via the short range communication link. Optionally, the additional user domain information is conveyed to the new cast device 108 or display assistant device 190 via the WLAN after the new device has joined the WLAN.

Once the cast device 108 and display assistant device 190 have been commissioned into the user domain, the cast device 108, the output device 106 and their associated media play activities could be controlled via two control paths (control path A and control path B). In accordance with control path A, a cast device application or one or more media play applications installed on the client device 104 are used to control the cast device 108 and its associated media play activities. Alternatively, in accordance with control path B, the display assistant device 190 is used to enable eyes-free and hands-free control of the cast device 108 and its associated media play activities (e.g., playback of media content play on the output device 106).

In some implementations, the cast device 108 and display assistant device 190 are two distinct and different devices that are configured to act as a cast receiver device and a cast transmitter device, respectively. The display assistant device 190 can provide information or content (which is generated locally or received from another source) to be projected onto the output device 106 via the cast device 108. Alternatively, in some implementations, the cast device 108 and display assistant device 190 are combined in an integrated cast device that is coupled to the output device 106.

In some implementations, the smart home environment 100 includes one or more smart home devices 120 (e.g., thermostats 122, hazard detectors 124, doorbells 126, door locks 128, alarm systems 130, camera systems 132, wall switches 136 and smart appliances 138 in FIG. 1). Regardless of whether a smart home device 120 has a display screen, it can rely on the client device 104 to provide a user interface during a commissioning process. Specifically, the client device 104 is installed with a smart device application that enables a user interface to facilitate commissioning of a new smart home device 120. Like a new cast device 108 or display assistant device 190, the new smart home device 120 can establish a short range communication link with the client device 104, and the wireless configuration data are communicated to the new smart home device 120 via the short range communication link, allowing the smart home device 120 to join the WLAN based on the wireless configuration data. Further, the smart home device 120 is optionally linked to the account of the user domain to which the cast device 108 and display assistant device 190 are linked as well. Once the smart home device 120 and the display assistant device 190 have been commissioned into the user domain, the smart home device 120 could be monitored and controlled via the display assistant device 190 in accordance with Control Path C as the cast device 108 is controlled via the display assistant device 190 in accordance with Control Path B. For example, voice commands can be inputted into the display assistant device 190 to review recording of an outdoor camera 132 mounted next to a door and control a door lock 128 based on security events detected in the recordings.

Referring to FIG. 2A, after the cast device 108 and the voice-activated electronic device 190 are both commissioned and linked to a common user domain, the voice-activated electronic device 190 can be used as a voice user interface to enable eyes-free and hands-free control of media content streaming to the cast device 108 involving no remote control, client device 104 or other second screen device. For example, the user may give voice commands such as "Play Lady Gaga on Living Room speakers." A Lady Gaga music track or video clip is streamed to a cast device 108 associated with the "Living Room speakers." In another example, the user gives voice commands such as "Show photos of Morgan and I on the Kitchen display." Accordingly, a photo or video clip is streamed to a cast device 108 and/or electronic device 190 associated with the "Kitchen display." The client device 104 is not involved, nor is any cast device application or media play application loaded on the client device 104.

In some implementations, the server system 164 includes cloud cast and display assistance functionalities. These functionalities may be implemented in individual servers within the server system 164, such as the cloud cast service server 116 and/or the voice/display assistance server 112, or may be integrated with the server system 164. The cloud cast service 116 is the proxy service that communicatively links the voice-activated electronic device 190 to the cast device 108 and makes casting to the cast device 108 possible without involving any applications on the client device 104. For example, a voice message is recorded by an electronic device 190, and the voice message is configured to request media play on a media output device 106. Optionally, the electronic device 190 partially processes the voice message locally. Optionally, the electronic device 190 transmits the voice message or the partially processed voice message to the server system 164 (the voice/display assistance server 112) via the communication networks 110 for further processing. The server system 164 (cloud cast service server 116) determines that the voice message includes a first media play request, and that the first media play request includes a user voice command to play media content on a media output device 106 and a user voice designation of the media output device 106. The user voice command further includes at least information of a first media play application (e.g., YouTube and Netflix) and the media content (e.g., Lady Gaga music, photos and/or videos that include Morgana as a subject matter) that needs to be played. Furthermore, in some implementations the user voice command further includes an instruction for the electronic device 190 to implement, such as a modification to a particular media content or to share media content with another user.

In accordance with the voice designation of the media output device, the cloud cast service server 116 identifies in a device registry (not shown) a cast device associated in the user domain with the electronic device 190 and coupled to the media output device 106. The cast device 108 is configured to execute one or more media play applications for controlling the media output device 106 to play media content received from one or more media content hosts 114. Then, the cloud cast service server 116 sends to the cast device 108 a second media play request including the information of the first media play application and the media content that needs to be played. Upon receiving the information sent by the cloud cast service server 116, the cast device 108 executes the first media play application and controls the media output device 106 to play the requested media content.

In some implementations, the user voice designation of the media output device 106 includes description of the destination media output device. The cloud cast service server 116 identifies in the registry the destination media output device among a plurality of media output devices according to the description of the destination media output device. In some implementations, the description of the destination media output device includes at least a brand ("Samsung TV") or a location of the media output device 106 ("my Living Room TV").

As further illustrated in FIG. 2A, the server system 164 includes one or more processors 212, a video storage database 210, a device and account database 214, an I/O interface to one or more client devices 216, and an I/O interface to one or more video sources 218, which will be described in greater detail in FIG. 2C.

Figure 2B:
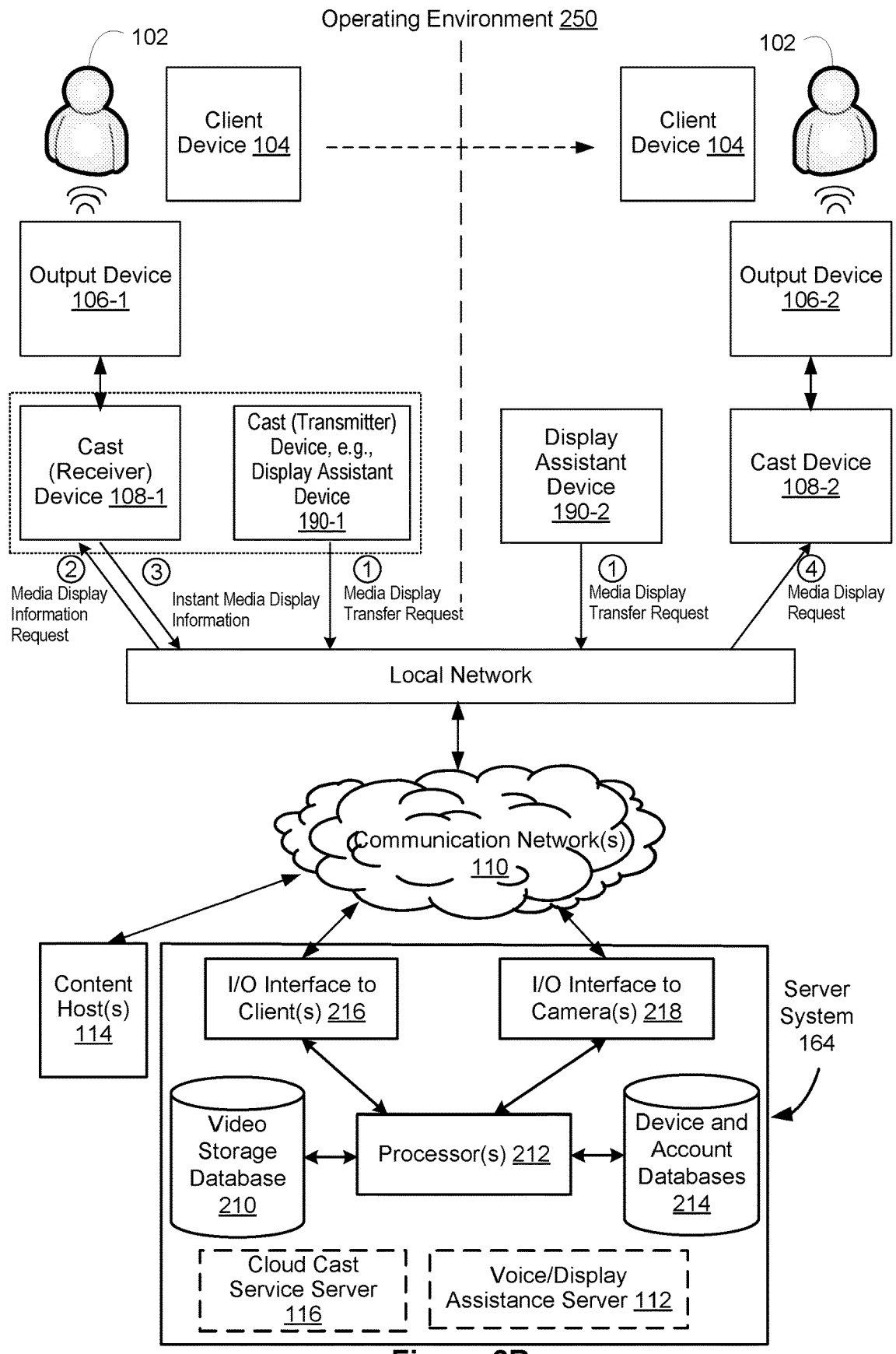
FIG. 2B is another example operating environment in which voice-activated electronic devices interact with cast devices, client devices or a server system of a smart home environment in accordance with some implementations.

FIG. 2B is another example operating environment 250 in which voice-activated electronic devices 190 interact with cast devices 106, client devices 104, other electronic devices 190, and/or a server system 164 of a smart home environment 100 in accordance with some implementations of the present disclosure. The smart home environment 100 includes a first cast device 108-1 and a first output device 106-1, or a first electronic device 192-1, coupled to the first cast device 108-1. The smart home environment 100 also includes a second cast device 108-2 and a second output device 106-2, or second electronic device 190-2, coupled to the second cast device 108-2. The cast devices 108-1 and 108-2, or electronic devices 190 and 192, are optionally located in the same location (e.g., the living room) or two distinct locations (e.g., two rooms) in the smart home environment 100. Each of the cast devices 108-1 and 108-2, or the electronic devices 190 and 192, is configured to obtain media or Internet content from media hosts 114 for display on the output device 106 coupled to the respective cast device 108-1 or 108-2 and/or the electronic devices 190. Both the first and second cast devices, or the electronic devices 190, are communicatively coupled to the cloud cast service server 116 and the content hosts 114.

The smart home environment 100 further includes one or more voice-activated electronic devices 190 that are communicatively coupled to the server system 164. In some implementations, the server system 164 includes separate servers for managing cloud cast (e.g., the cloud cast service server 116) or voice/display assistance (e.g., voice/display assistance server 112). The one or more voice-activated electronic devices 190 and 192 includes at least one display assistant device (e.g., display assistant device 190-1). In some implementations, the voice-activated electronic devices 190 are disposed independently of the cast devices 108 and the output devices 106. For example, as shown in FIG. 1, the electronic device 190-1 is disposed in a room where no cast device 108 or output device 106 is located. In some implementations, the first electronic device 192-1 is disposed in proximity to the first cast device 108-1 and the first output device 106-1, e.g., the first electronic device 192-1, the first cast device 108-1 and the first output device 106-1 are located in the same room. Optionally, the second electronic device 190-2 is disposed independently of or in proximity to the second cast device 108-2 and the second output device 106-2.

In some embodiments, when media content is being played on the first output device 106-1 or the electronic device 190, a user sends a voice command to any of the electronic devices 190 (e.g., 190-1 or 190-2 in FIG. 2B) to request play of the media content to be transferred to the second output device 106-2 or a second electronic device 190-2. The voice command includes a media play transfer request (e.g., a user instruction to transfer the media content). The voice command is transmitted to the cloud cast service server 116. The cloud cast service server 116 sends a media display information request to the first cast device 108-1 to request instant media play information of the media content that is currently being played on the first output device 106-1 coupled to the first cast device 108-1. The first cast device 108-1 then returns to the server system 164 (cloud cast service server 116) the requested instant play information including at least information the media content that is currently being played (e.g., "Lady Gaga—Half time show—Super Bowl 2017"), and a temporal position related to playing of the media content. The second cast device 108-2 or the second electronic device 190-2 then receives a media display request including the instant play information from the cloud cast service server 116, and in accordance with the instant play information, executes the first media play application that controls the second output device 106-2 or the second electronic device 190-2 to play the media content from the temporal location.

Figure 2C:
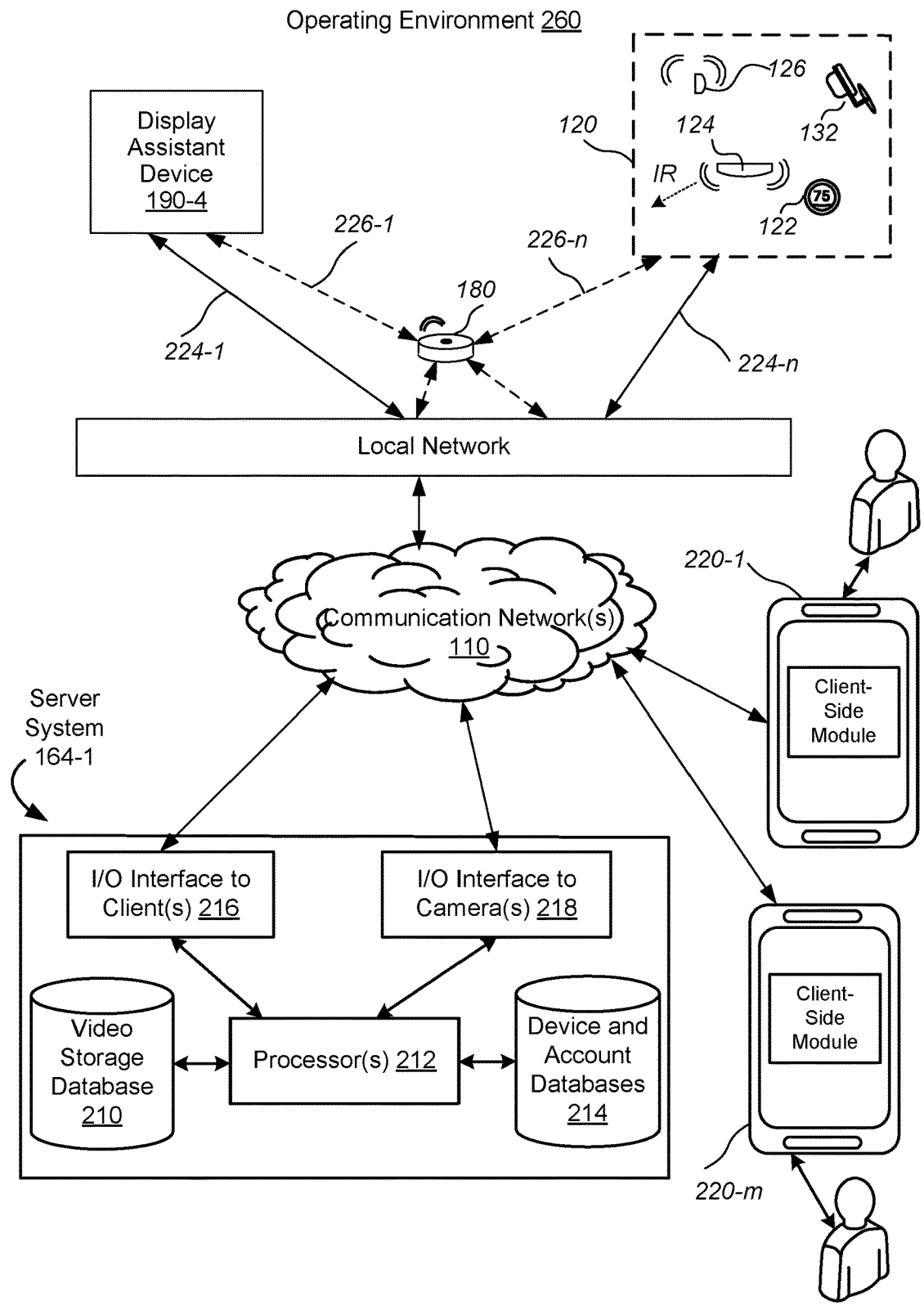
FIG. 2C is another example operating environment in which a voice-activated electronic device interacts with smart home devices, a hub device, and a server system of a smart home environment in accordance with some implementations.

FIG. 2C is another example operating environment 260 in which a voice-activated electronic device 190 (e.g., a display assistant device) interacts with smart home devices 120 (e.g., smart thermostats 122, hazard sensing detectors 124, smart doorbells 126, and network connected camera systems 132), a hub device 180, and a server system 164 of a smart home environment 100 in accordance with some implementations.

In some implementations, the display assistant device 190 includes one or more built-in cameras (e.g., camera 362, FIG. 3) and is configured to perform a remote monitoring function (e.g., home monitoring), in which video captured by the cameras is streamed to the remote server system 164 for monitoring uses by authorized users. The server system 164 provides data processing for monitoring and facilitating review of events (e.g., motion, audio, security, etc.) from data (e.g., video data) captured by electronic device(s) 190 and by the smart devices 120 in the smart home environment 100, such as smart doorbells 126, and network connected camera systems 132. In some implementations, the smart home devices 120 and the electronic devices 190 that are configured to capture video data are also referred to as video source(s). Typically, it is usually only the owner (e.g., a homeowner) of the display assistant device 190, who created the account associated with the device, that has access to live streaming video in the monitoring mode. In some implementations, the owner can also give access to "family" member accounts (e.g., to other members of the household) who can then access the streamed video in monitoring mode. "Family" accounts are generally a set of permissions between two or more accounts stored at a remote service (e.g., the server system 164). These permissions enable access to information, such as monitoring of video streams in this instance, and/or control for various things (e.g., control of a smart thermostat in the smart home environment). Family accounts are typically persistent and can be set by device and/or by device functions. In some implementations, access to video content in the monitoring mode is available only to authorized accounts (e.g., a master account and/or a family account).

As illustrated in FIG. 2C, the server system 164 receives data from the various smart home devices 120 and from the electronic devices 190 located at various physical locations (e.g., inside or in proximity to homes, restaurants, stores, streets, parking lots, and/or the smart home environments 100 of FIG. 1A). In some implementations, the smart home devices 120 and the electronic device 190 are linked to more than one reviewer account (e.g., multiple user accounts may be subscribed to a single smart home environment).

In some implementations, the server system 164 provides video monitoring data for the video sources to client devices 220 associated with the reviewer accounts. For example, the portable electronic device 104 is an example of the client device 220. In some implementations, the server system 164 comprises a video processing server that provides video processing services to the video sources and client devices 220. In some implementations, the server system 164 receives non-video data from one or more smart devices 120 (e.g., audio data, metadata, numerical data, etc.). In some implementations, the non-video data is analyzed to provide context for motion events detected by the video cameras 132 and/or doorbell cameras 126. In some implementations, the non-video data indicates that an audio event (e.g., detected by an audio device), security event (e.g., detected by a perimeter monitoring device), hazard event (e.g., detected by a hazard detector 124), medical event (e.g., detected by a health-monitoring device), or the like has occurred within a smart home environment 100.

In some implementations multiple reviewer accounts are linked to a single smart home environment 100. For example, multiple occupants of a smart home environment 100 may have accounts linked to the smart home environment. In some implementations, during a device commissioning process, the homeowner also creates reviewer accounts (e.g., "family" member accounts) for other members of the household, thereby authorizing them to access the home monitoring data. In some implementations, each reviewer account is associated with a particular level of access. In some implementations, each reviewer account has personalized notification settings. In some implementations, a single reviewer account is linked to multiple smart home environments 100. For example, a person may own or occupy, or be assigned to review and/or govern, multiple smart home environments 100. In some implementations, the reviewer account has distinct levels of access and/or notification settings for each smart home environment.

In some implementations, each of the video sources includes one or more voice-activated display assistant devices 190, video cameras 132 or doorbell cameras 126 that capture video and send the captured video to the server system 164 substantially in real-time. In some implementations, each of the video sources includes one or more electronic devices 190 that that capture video and send the captured video to the server system 164 in real-time (e.g., within 1 second, 10 seconds, 30 seconds, or 1 minute). In some implementations, each of the video sources includes one or more doorbell cameras 126 that capture video and send the captured video to the server system 164 in real-time (e.g., within 1 second, 10 seconds, 30 seconds, or 1 minute). In some implementations, each of the doorbells 126 include a video camera that captures video and sends the captured video to the server system 164 in real-time.

In some implementations, a video source includes a controller device (not shown) that serves as an intermediary between the one or more doorbells 126 and the server system 164. The controller device receives the video data from the one or more doorbells 106, optionally performs some preliminary processing on the video data, and sends the video data and/or the results of the preliminary processing to the server system 164 on behalf of the one or more doorbells 126 (e.g., in real-time). In some implementations, each camera has its own on-board processing capabilities to perform some preliminary processing on the captured video data before sending the video data (e.g., along with metadata obtained through the preliminary processing) to the controller device and/or the server system 164. In some implementations, one or more of the cameras is configured to optionally locally store the video data (e.g., for later transmission if requested by a user). In some implementations, a camera is configured to perform some processing of the captured video data, and, based on the processing, either send the video data in substantially real-time, store the video data locally, or disregard the video data.

Figure 6:
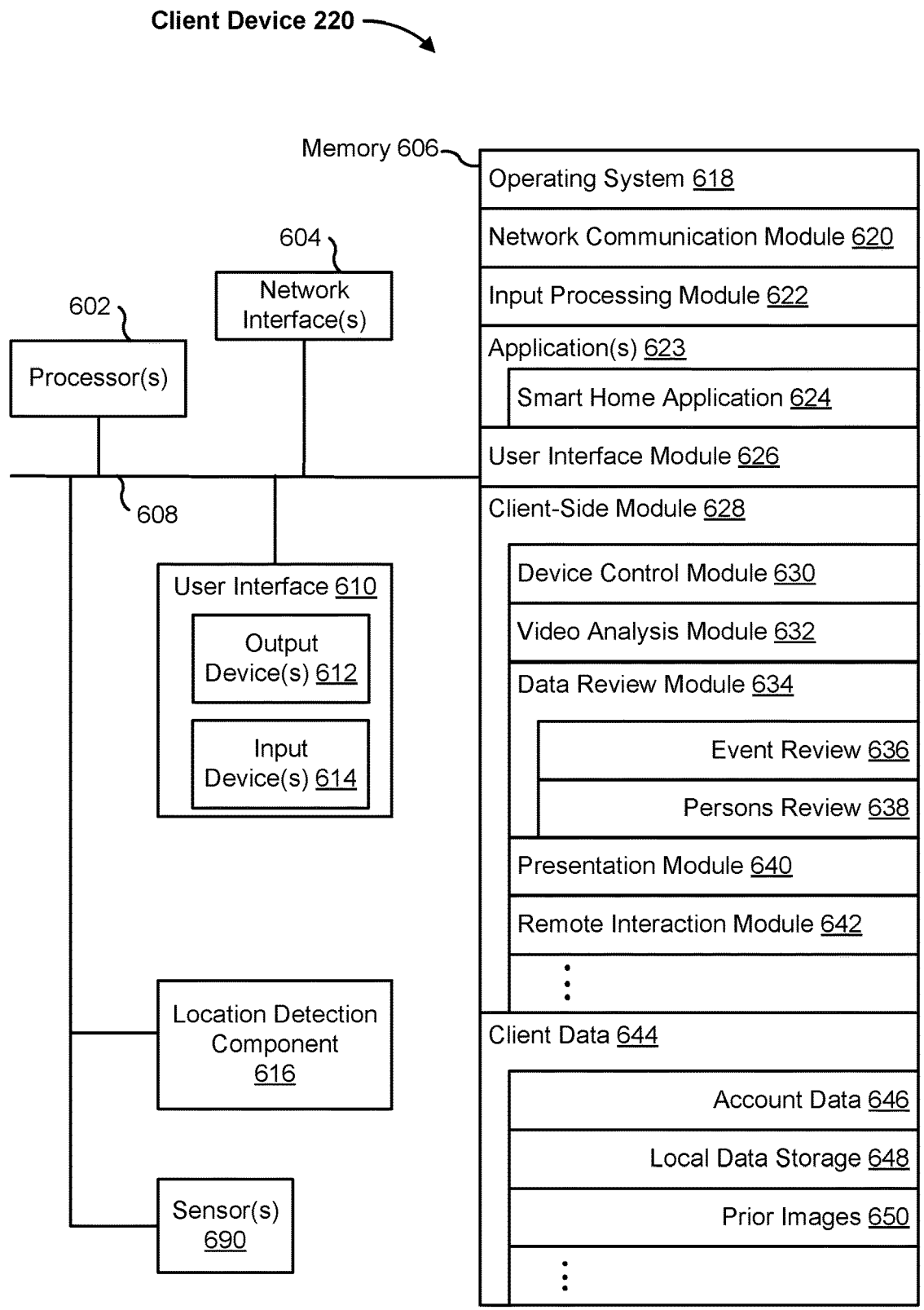
FIG. 6 is a block diagram illustrating a representative client device in accordance with some implementations.

In accordance with some implementations, a client device 220 includes a client-side module or smart home application, such as client-side module 628 in FIG. 6. In some implementations, the client-side module communicates with a server-side module executed on the server system 164 through the one or more networks 110. The client-side module provides client-side functionality for the event monitoring and review processing and communications with the server-side module. The server-side module provides server-side functionality for event monitoring and review processing for any number of client-side modules each residing on a respective client device 220. In some implementations, the server-side module also provides server-side functionality for video processing and camera control for any number of the video sources, including any number of control devices, electronic devices 190, cameras 132, and doorbells 126.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources. The video storage database 210 stores raw video data received from the video sources, as well as various types of metadata, such as motion events, event categories, event category models, event filters, and event masks, for use in data processing for event monitoring and review for each reviewer account. In some implementations, some of the video sources (e.g., the display assistant device 190) are configured to perform events based recording, whereby video and audio data are generally collected and streamed to the server system 164 for display on authorized client devices without recording (e.g., the video and audio data are not stored by the server). In this mode, the video sources are configured to start recording (e.g., the video and audio data are stored on the server system 164, e.g., on a video storage database 210, or locally on the devices) when persons and/or events are sensed by the video sources.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 110 include local area networks (LAN) and wide area networks (WAN) such as the Internet. The one or more networks 110 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a cloud server, a distributed cloud computing system, a handheld computer, a tablet computer, a laptop computer, a desktop computer, or a combination of any two or more of these data processing devices or other data processing devices.

In some implementations, a server-client environment includes both a client-side portion (e.g., the client-side module) and a server-side portion (e.g., the server-side module). The division of functionality between the client and server portions of operating environment can vary in different implementations. Similarly, the division of functionality between a video source and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects may be performed by the server system 164, a client device 220, and a video source 222 cooperatively.

In some implementations, the video source(s) transmits one or more streams 224 of video data to the server system 164 via communication network(s) 110. In some implementations, the one or more streams include multiple streams, of respective resolutions and/or frame rates, of the raw video captured by the image sensor. In some implementations, the multiple streams include a "primary" stream with a certain resolution and frame rate (e.g., corresponding to the raw video captured by the image sensor), and one or more additional streams. An additional stream is optionally the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream. In some implementations, the primary stream and/or the additional streams are dynamically encoded (e.g., based on network conditions, server operating conditions, camera operating conditions, characterization of data in the stream (e.g., whether motion is present), user preferences, and the like.

In some implementations, the video source(s) transmits one or more streams 224 of video data directly to a client device 220 (e.g., without being routed to, or processed by, the server system 164). In some implementations, the video sources transmit one or more streams 226 of video data to the server system 164 via the hub device 180. In some implementations, one or more of the streams is stored at the electronic device 190 (e.g., in memory 306, FIG. 3) and/or a local storage device (e.g., a dedicated recording device, not shown), such as a digital video recorder (DVR). For example, in accordance with some implementations, the voice-activated electronic device 190 stores the most recent 24 hours of video footage recorded by the camera. As another example, in accordance with some implementations, the voice-activated electronic device 190 stores up to 24 hours of video footage recorded by the camera (e.g., up to 24 hours of motion event data). In some implementations, portions of the one or more streams are stored at the voice-activated electronic device 190 and/or the local storage device (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream.

Figure 2D:
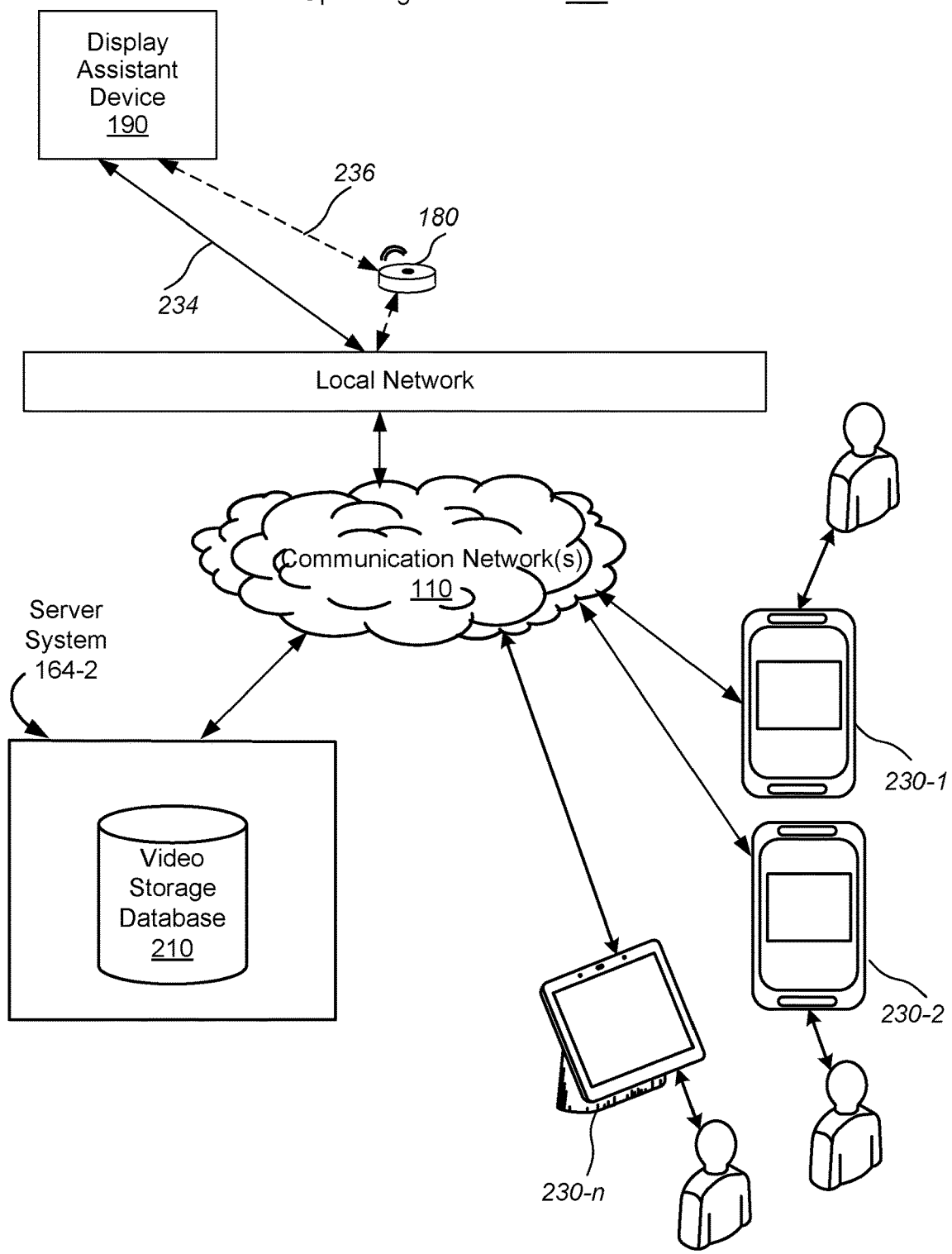
FIG. 2D is another example operating environment in which a voice-activated electronic device interacts with a hub device, a server system of a smart home environment, and second devices in accordance with some implementations.

FIG. 2D is another example operating environment 270 in which a voice-activated electronic device 190 (e.g., a display assistant device) interacts with a hub device 180, a server system 164 of a smart home environment 100, and second devices 230 in accordance with some implementations.

In some implementations, the voice-activated electronic device 190 (display assistant device) includes one or more built-in cameras and is configured to perform a video (and audio) communication function, in which video and audio are captured by the built-in camera(s) and microphone(s) of the device 190 (e.g., using camera 362 and microphones 342, FIG. 3) and are transmitted to one or more second devices 230 participating in the video communication via the remote server system 164. Typically, the video communication function may be enabled by a user who is in proximity to (and logged into) the display assistant device. Unlike the monitoring uses described in FIG. 2C, users of second devices 230 who are participating in a video communication with a user of the device 190 need not be "family" account members. In other words, the one or more second devices 230 and/or accounts associated with the second devices 230 may not be related to the authorized user account associated with the display assistant device. In case of a video communication, access to the video stream by the other party (e.g., the second devices 230) is only a temporary permission that lasts for the duration of the call.

Examples of representative second devices 230 include a handheld computer, a wearable computing device, a personal digital assistant (PDA), a tablet computer, a laptop computer, a desktop computer, a cellular telephone, a smart phone, an enhanced general packet radio service (EGPRS) mobile phone, an ebook reader, another display assistant device (e.g., 230-n, FIG. 2D) or a combination of any two or more of these data processing devices or other data processing devices.

In some implementations, one or more of the streams is stored at the electronic device 190 (e.g., in memory 306, FIG. 3) and/or a local storage device (e.g., a dedicated recording device, not shown), such as a digital video recorder (DVR). In some implementations, one or more of the streams is stored at the server system (e.g., in memory 306, FIG. 3) and/or in a database (e.g., the video storage database 210).

Figure 2E:
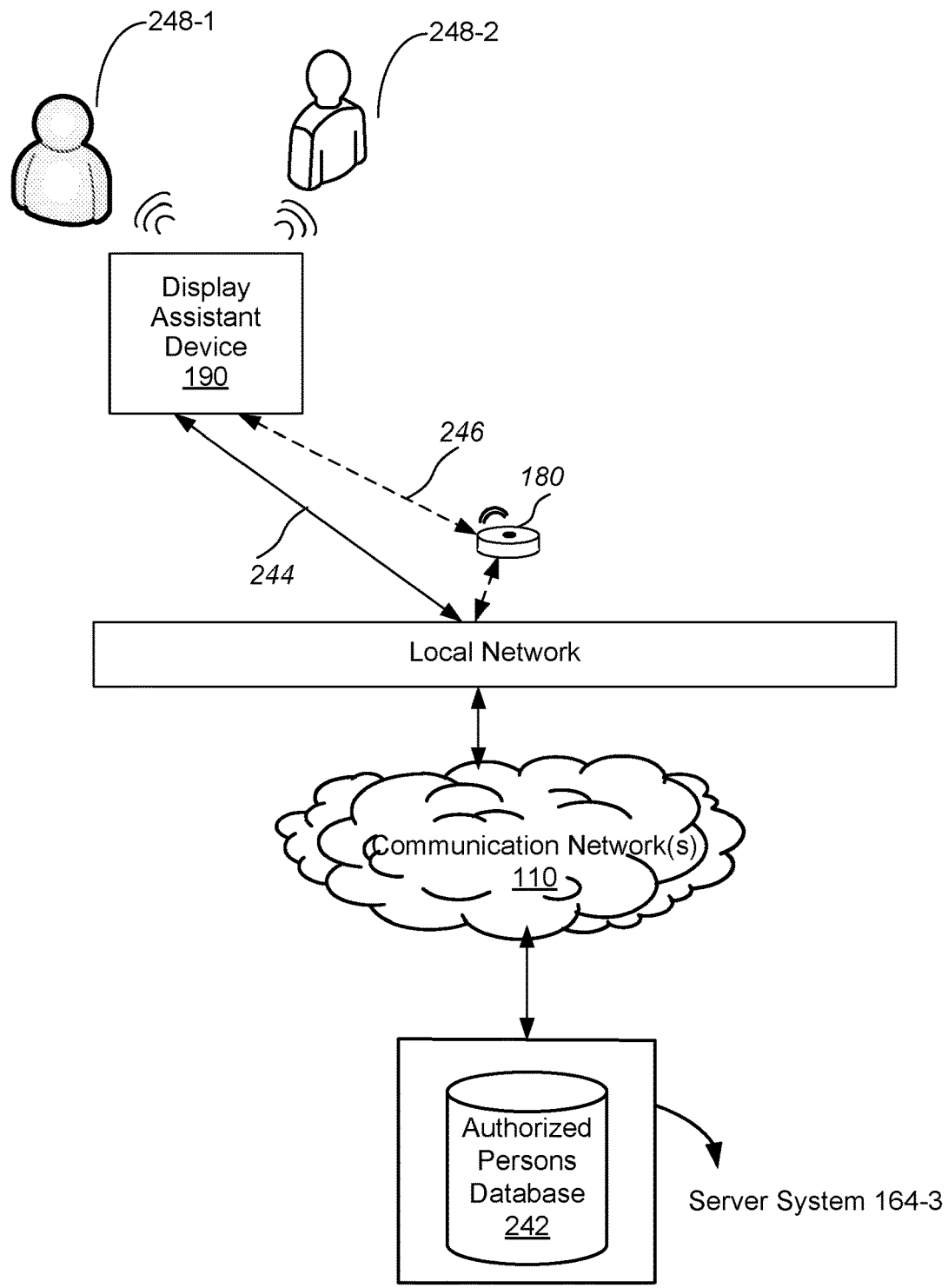
FIG. 2E is another example operating environment in which a voice-activated electronic device interacts with a hub device, a server system of a smart home environment, and persons in the smart home environment, in accordance with some implementations.

FIG. 2E is another example operating environment 280 in which a voice-activated electronic device 190 (e.g., a display assistant device) interacts with a hub device 180, a server system 164 of a smart home environment 100, and persons 248 in the smart home environment 100, in accordance with some implementations.

In some implementations, the voice-activated electronic device 190 (display assistant device) is configured for use by authorized users. In some implementations, after a period of inactivity, the electronic device 190 goes into a locked state and a user is prompted to input a password to unlock the device 190 before the user can further interact with the device 190. In some implementations, the electronic device 190 is configured to detect one or more persons 248 standing in proximity (e.g., in front of) to the electronic device 190 (e.g., presence sensors 360, FIG. 3). In some implementations, the electronic device 190 has technology that enables the device to distinguish between persons and other objects in the room. The electronic device 190 performs a face match function (e.g., face recognition or face unlock function), whereby one or more images of the persons are captured (e.g., using the camera 362, FIG. 3) and compared against a database of authorized persons 242 in the server system 164. In accordance with a match between the captured images and the images in the authorized persons database 242, the electronic device 164 unlocks itself to enable further interactions with the authorized user. In some implementations, images of authorized users are stored locally on the electronic device 190 (e.g., authorized users data 338, FIG. 3) and the comparison between the captured images and the images of authorized users is performed locally on the device.

In some implementations, after the electronic device 190 has been unlocked, the electronic device 190 further interacts with the user by selecting or moderating content based on the user identification. For example, as discussed in PCT Application No. PCT/US18/54861, filed Oct. 8, 2018, entitled "Systems and Methods for Displaying Media Files," which is incorporated by reference herein in its entirety, the electronic device 190 automatically curates content such as media files based on the user identification and displays a selection of the curated content for further user interaction. In some implementations, this user identification can be performed using the camera 362 of an electronic device 190. Similarly, device functionality of the electronic device 190 can be enabled or disabled based on results of a facial match operation.

Figure 3:
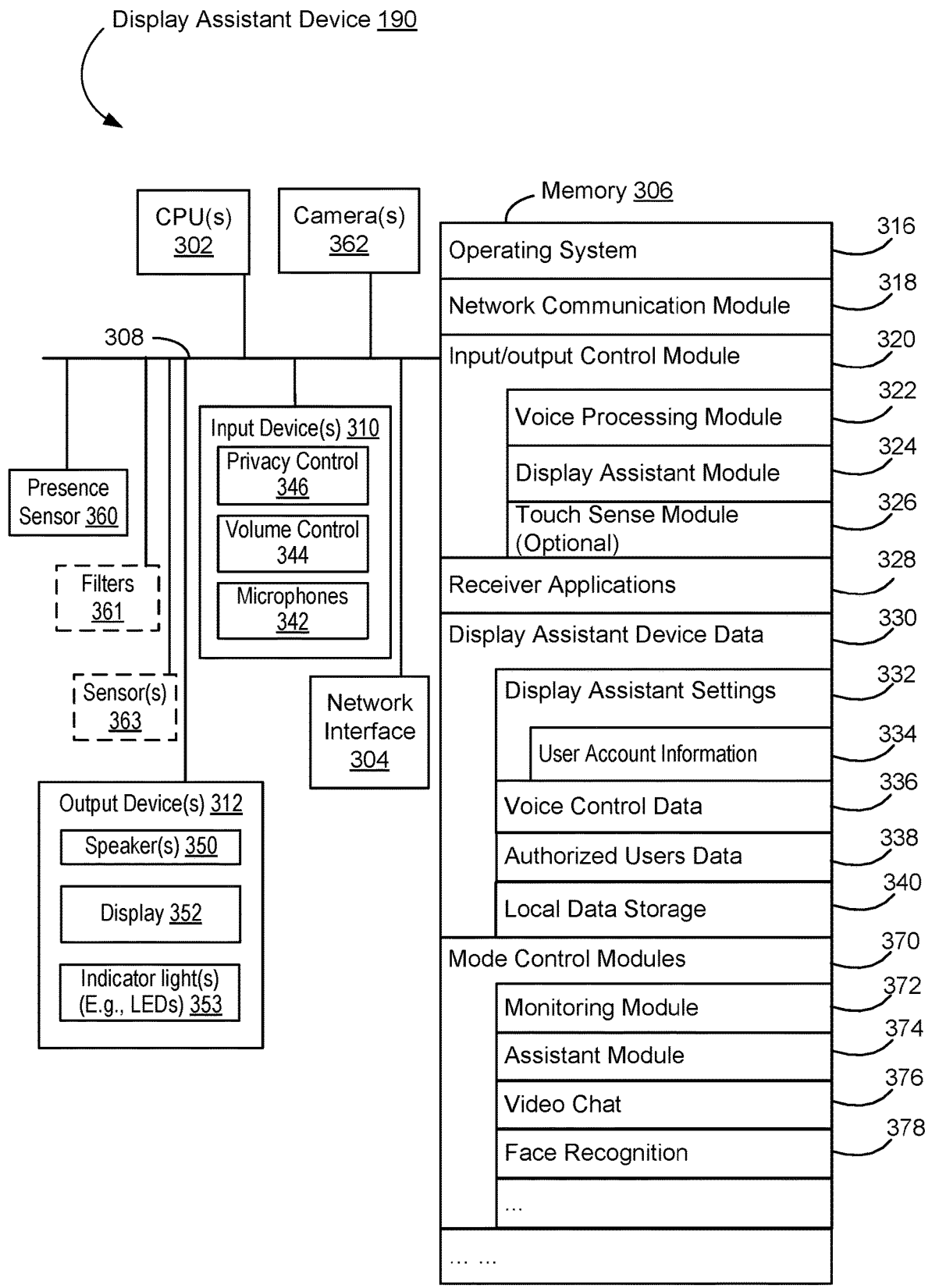
FIG. 3 is a block diagram illustrating an example display assistant device in accordance with some implementations.

FIG. 3 is a block diagram illustrating an example display assistant device 190 that is applied as a voice interface to collect user voice commands in a smart home environment 100 in accordance with some implementations. The display assistant device 190 typically includes one or more processing units (CPUs) 302, one or more network interfaces 304, memory 306, and one or more communication buses 308 for interconnecting these components (sometimes called a chipset). The display assistant device 190 includes one or more camera(s) that are configured to capture images and video. The display assistant device 190 includes one or more output devices 312, including one or more speakers 350, a display 352, and one or more indicator light(s) (e.g., LEDs) 353 that are configured to display a visual indication of the status of the camera(s) 362, including an operating mode of the display assistant device 190. In some implementations, the display assistant device 190 also includes filters 361. In some implementations, the filters 361 are software affordances that are selectively engaged to adjust a field of view (e.g., an angle) of the camera(s) 362 (e.g., at particular modes of the display assistant device 190). In some implementations, the display assistant device 190 also includes sensor(s) 363 that detect events or changes.

As further illustrated in FIG. 3, the display assistant device 190 also includes one or more input devices 310 that facilitate user input, including one or more microphones 342, a volume control 344 and a privacy control 346. The volume control 344 is configured to receive a user action (e.g., a press on a volume up button or a volume down button, a press on both volumes up and down buttons for an extended length of time) that controls a volume level of the speakers 350 or resets the display assistant device 300. The privacy control 346 is configured to receive a user action that controls privacy settings of the display assistant device (e.g., whether to deactivate the microphones 342 and/or the cameras 362). In some implementations, the privacy control 346 is a physical button located on the display assistant device 190. In some implementations, the input devices 310 of the display assistant device 190 include a touch detection module (not shown in FIG. 3) that is integrated on the display panel 352 and configured to detect touch inputs on its surface. In some implementations, the input devices 310 of the display assistant device 300 include a camera module configured to capture images and/or a video stream of a field of view. Additionally, and/or alternatively, in some implementations, the display assistant device 190 includes a mode control module 370 that is configured to control the camera functions. Alternatively, the input devices 310 of the display assistant device 190 does not include any camera or touch detection module, and the camera-related functionalities are included in the mode control modules 370 of the because they relatively expensive and can compromise the goal of offering the display assistant device 190 as a low cost user interface solution.

In some implementations, the display assistant device 190 further includes a presence sensor 360 configured to detect a presence of a user in a predetermined area surrounding the display assistant device 190. Under some circumstances, the display assistant device 190 operates at a sleep or hibernation mode that deactivates detection and processing of audio inputs, and does not wake up from the sleep or hibernation mode or listen to the ambient (i.e., processing audio signals collected from the ambient) until the presence sensor 360 detects a presence of a user in the predetermined area. An example of the presence sensor 360 is an ultrasonic sensor configured to detect a presence of a user.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302 (or CPU(s)). Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

Operating system 316 including procedures for handling various basic system services and for performing hardware dependent tasks;

Network communication module 318 for connecting the display assistant device 190 to other devices (e.g., the server system 164, the cast device 108, the client device 104, client devices 220, second devices 230, the smart home devices 120, the hub device 180, and the other voice-activated electronic device(s) 190) via one or more network interfaces 304 (wired or wireless) and one or more networks 110, such as the Internet, other wide area networks, local area networks, metropolitan area networks, and so on;

Input/output control module 320 for receiving inputs via one or more input devices 310 enabling presentation of information at the display assistant device 190 via one or more output devices 312, including:

Voice processing module 322 for processing audio inputs or voice messages collected in an environment surrounding the display assistant device 190, or preparing the collected audio inputs or voice messages for processing at the server system 164 (a voice/display assistance server 112 or a cloud cast service server 118);

Display assistant module 324 for displaying additional visual information including but not limited to a media content item (e.g., a YouTube video clip), news post, social media message, weather information, personal picture, a state of audio input processing, and readings of smart home devices; and Touch sense module 326 for sensing touch events on a top surface of the display assistant device 190; and One or more receiver applications 328 for responding to user commands extracted from audio inputs or voice messages collected in an environment surrounding the display assistant device 190, including but not limited to, a media play application, an Internet search application, a social network application and a smart device application;

Display assistant device data 330 storing at least data associated with the display assistant device 190, including:

Display assistant settings 332 for storing information associated with the display assistant device 190 itself, including common device settings (e.g., service tier, device model, storage capacity, processing capabilities, communication capabilities, etc.) and information of a user account 334 in a virtual user domain to which the display assistant device 190 is linked;

Voice control data 336 for storing audio signals, voice messages, response messages and other data related to voice interface functions of the display assistant device 190;

Authorized users data 338 for storing information of users authorized to use the display assistant device, including images, voice information, fingerprint information of the authorized users; and Local data storage 340 for selectively storing raw or processed data associated with the display assistant device 190, such as event data and/or video data captured by the camera(s) 362;

Mode control modules 370 for enabling various modes of operation of the display assistant device 190 and for the interactions between the modes (e.g., mode switching), including:

Monitoring module 372 for transmitting video captured by the cameras 362 to the server system 164 for monitoring uses. The monitoring uses include transmission of the video to one or more remote clients (e.g., client device 104 and client devices 220) that are authorized to access the video;

Assistant module 374 for processing and responding to voice commands and touch screen commands directed to the display assistant device 190, including displaying media files;

Video chat 376 for enabling video-telephony (e.g., videoconference calls) between a user of the display assistant device 190 and users of second devices 230 (FIG. 2D); and Face recognition 378 for enabling access of the display assistant device 190 to authorized users, in which one or more images of persons (e.g., persons 248, FIG. 2E) captured by the cameras 362 (i) are transmitted to the server system 164 for comparison against an authorized persons database 242 and/or (ii) are compared locally against the authorized users data 338.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
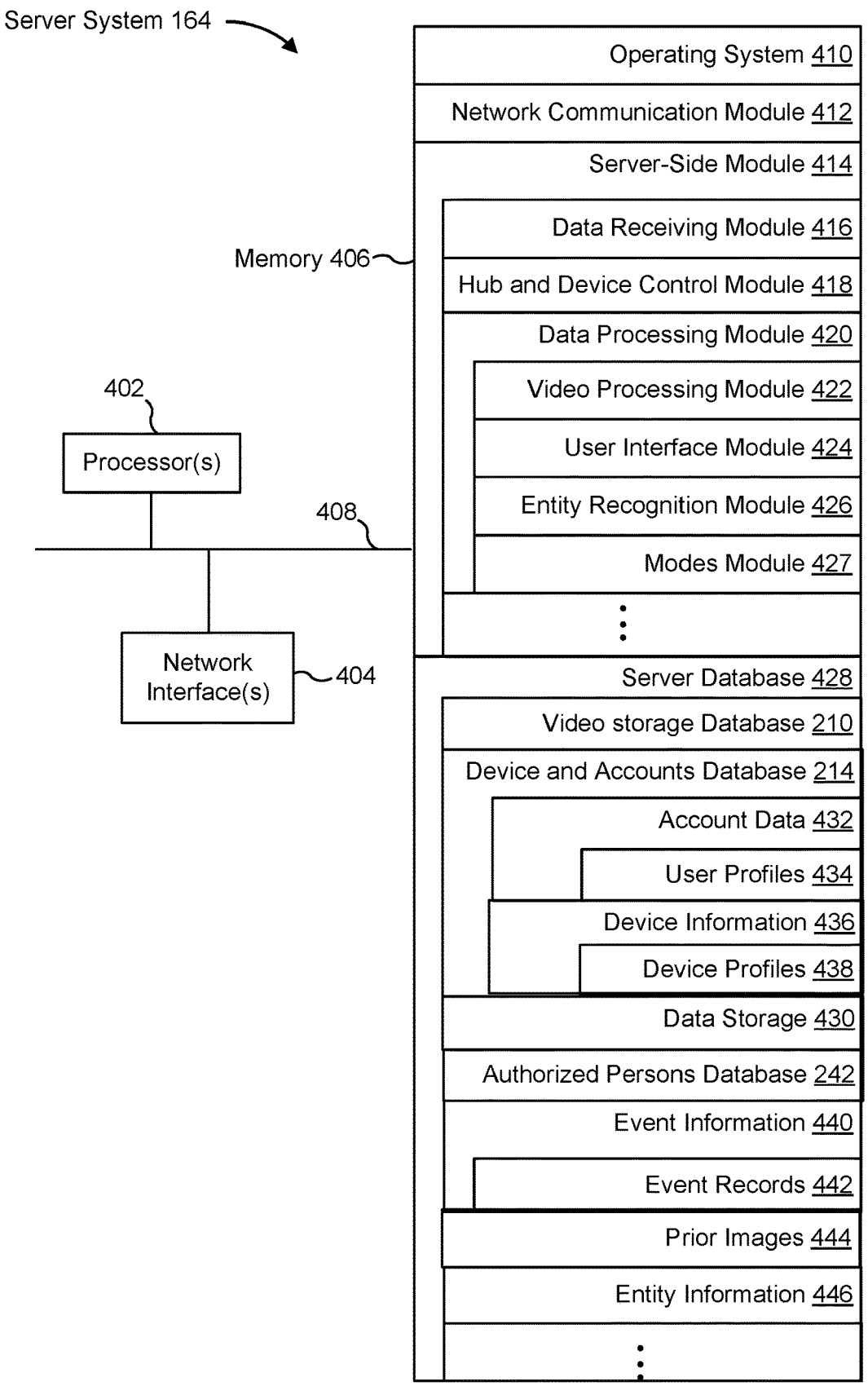
FIG. 4 is a block diagram illustrating a representative server system in accordance with some implementations.

FIG. 4 is a block diagram illustrating the server system 164 in accordance with some implementations. The server system 164 includes one or more processor(s) (e.g., CPUs) 402, one or more network interfaces 404 (e.g., including an I/O interface to one or more client devices and an I/O interface to one or more electronic devices, such as the I/O interface client(s) 216 and the I/O interface to camera(s) 218 in FIG. 2), memory 406, and one or more communication buses 408 for interconnecting these components (sometimes called a chipset). The memory 406 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 406, optionally, includes one or more storage devices remotely located from one or more processor(s) 402. The memory 406, or alternatively the non-volatile memory within memory 406, includes a non-transitory computer-readable storage medium. In some implementations, the memory 406, or the non-transitory computer-readable storage medium of the memory 406, stores the following programs, modules, and data structures, or a subset or superset thereof:

an operating system 410 including procedures for handling various basic system services and for performing hardware dependent tasks;

a network communication module 412 for connecting the server system 164 to other systems and devices (e.g., client devices, electronic devices, and systems connected to one or more networks 110) via one or more network interfaces 404 (wired or wireless);

a server-side module 414, which provides server-side functionalities for device control, data processing, and data review, including, but not limited to:

a data receiving module 416 for receiving data from electronic devices (e.g., video data and audio data from display assistant device 190, FIG. 2C), and preparing the received data for further processing and storage in the server database 428;

a device control module 418 for generating and sending server-initiated control commands to modify operation modes of electronic devices (e.g., the display assistant device 190 and the smart devices 120 of the smart home environment 100), and/or receiving (e.g., from client devices 220 and client device 104) and forwarding user-initiated control commands to modify operation modes of the electronic devices;

a data processing module 420 for processing the data provided by the electronic devices, and/or preparing and sending processed data to a device for review (e.g., client devices 220 for review by a user), including, but not limited to:

a video processing module 422 for processing (e.g., categorizing and/or recognizing) detected entities and/or event candidates within a received video stream (e.g., a video stream from the display assistant device 190 or from the smart doorbell 126);

a user interface module 424 for communicating with a user (e.g., sending alerts, timeline events, etc. and receiving user edits and zone definitions and the like);

an entity recognition module 426 for analyzing and/or identifying persons detected within smart home environments; and a modes module 427 for communicating information about the operating modes of the display assistant device 190 to the server system 164 and/or client devices; and a server database 428, including but not limited to:

a video storage database 210 (see FIG. 2) for storing raw video data received from the video sources (including the display assistant devices, cameras 132 and the smart doorbells 126), as well as various types of metadata, such as motion events, event categories, event category models, event filters, and event masks, for use in data processing for event monitoring and review for each reviewer account.

a devices and accounts database 214 for storing devices and accounts data including:

account data 432 for user accounts, including user account information such as user profiles 434, information and settings for linked hub devices and electronic devices (e.g., hub device identifications), hub device specific secrets, relevant user and hardware characteristics (e.g., service tier, subscriptions, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;

user profiles 434 including profiles for reviewer accounts registered with the video processing server, where a respective user profile includes account credentials for a respective reviewer account, and one or more video sources linked to the respective reviewer account;

device information 436 related to one or more devices such as device profiles 438, e.g., device identifiers and hub device specific secrets, independently of whether the corresponding hub devices have been associated with any user account;

a data storage 430 for storing data associated with each electronic device (e.g., each display assistant device 190) of each user account, as well as data processing models, processed data results, and other relevant metadata (e.g., names of data results, location of electronic device, creation time, duration, settings of the electronic device, etc.) associated with the data, where (optionally) all or a portion of the data and/or processing associated with the hub device 180 or smart devices are stored securely;

an authorized persons database 242 (FIG. 2E) for storing information of authorized users for electronic devices (e.g., the display assistant device 190), including images, voiceprints, fingerprints, confidence levels and the like;

event information 440 such as event records 442 and context information, e.g., contextual data describing circumstances surrounding an approaching visitor;

prior images 444 such as prior background images and/or entity images captured by camera(s) in various lighting conditions; and entity information 446 such as information identifying and/or characterizing entities (e.g., in the smart home environment 100).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above (e.g., an account management module for linking client devices, smart devices, and smart home environments).

In some implementations, the memory 406 includes a voice/display assistant application (not shown) that is executed to arrange voice processing of a voice message received from a voice-activated electronic device 190, directly process the voice message to extract a user voice command and a designation of a cast device 108 or another voice-activated electronic device 190, and/or enable a voice-activated electronic device 190 to play media content (audio or video)

In some implementations, the server system 164 includes cloud cast service (e.g., the cloud cast server 116, FIGS. 1A and 2A). The memory 406 further includes a cast device application 422 that is executed to provide server-side functionalities for device provisioning, device control, and user account management associated with cast device(s) 108. Further details of the cloud cast functionalities are found in PCT Application No. PCT/US15/64449, filed Dec. 7, 2019, entitled "Display Assistant Device," which is incorporated herein by reference in its entirety.

FIGS. 5A-5E are a perspective view, a front view, a rear view, a side view, a top view and a bottom view of a display assistant device 190 in accordance with some implementations, respectively. The display assistant device 190 includes a base 502 and a screen 504 (e.g., display 352, FIG. 3). The base 502 is configured for sitting on a surface. The screen 504 has a rear surface 506 at which the screen 504 is supported by the base.

The base 502 acts a speaker box. A speaker (e.g., speaker 350, FIG. 3) is concealed inside the base and configured to project sound substantially towards the front view of the display assistant device.

In some implementations, a bezel area includes one or more microphone holes 512. One or more microphones 342 are placed behind the microphone holes 512 and configured to collect sound from the ambient of the display assistant device 190.

In some implementations, the display assistant device 190 further includes a camera opening 520 that holds a camera (e.g., camera 362 of FIG. 3) that is configured to capture a field of view of the device. For instance, in some implementations, media content that is displayed on the device includes subject matter that was captured by the camera of the device. In some implementations, the camera is configured to detect a light condition in the smart home environment 100 where the display assistant device 190 sits. In some implementations, the display assistant device 190 is configured to adjust a brightness level of its screen 504 according to the light condition. The camera 362 is disposed behind the bezel area and exposed to light via a transparent part of the bezel area, e.g., the sensor opening 520. In some implementations, the display assistant device includes multiple camera openings 520 each configured to hold a camera. In some implementations, the camera openings 520 (and the cameras 362) may be positioned on both the screen side and the rear side of the display assistant device 190. In some implementations, the display assistant device 190 interacts with the smart home environment and, in some implementations, an on-board ambient light sensor (ALS), by using the screen 504 (e.g., display 352, FIG. 3) to project illumination when the scene (e.g., room in which the display assistant device 190 is located) is poorly lit.

In some implementations, the display assistant device 190 includes a status indicator light 516 (indicator light(s) 353 of FIG. 3), e.g., LED lights, that are configured to display a visual indication of the status of the camera, including an operation mode of the display assistant device 190. Further details of the status indicator light 516 are described in FIG. 7 and the section on "Device Operation Modes."

Figure 5A:
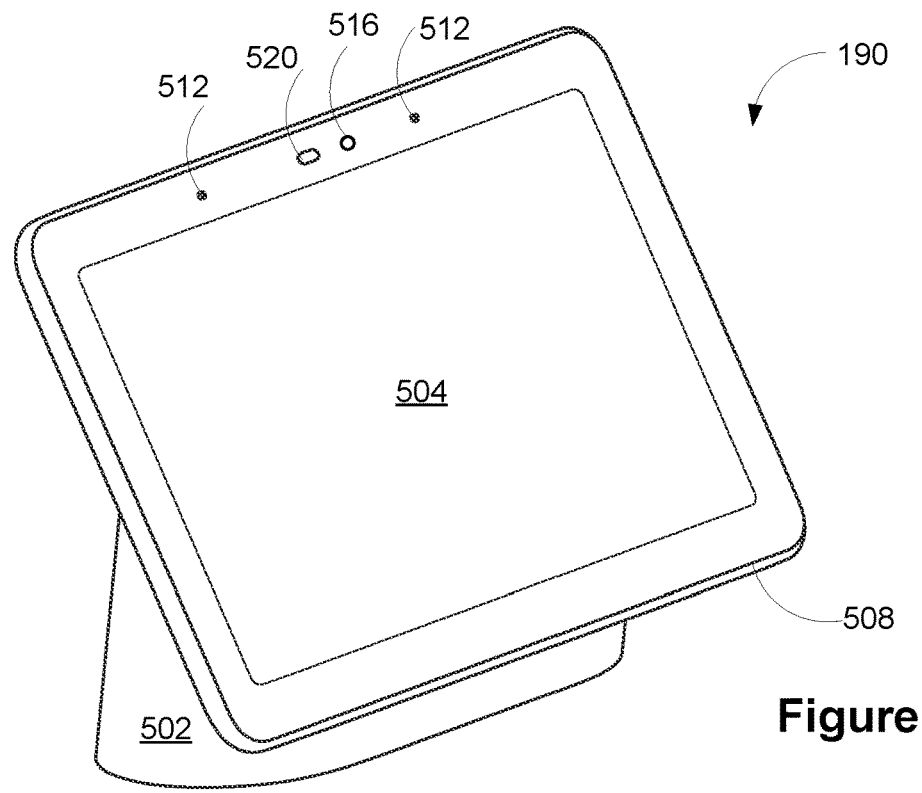
FIGS. 5A-5F are a perspective view, a front view, a rear view, a side view, a top view and a bottom view of a display assistant device in accordance with some implementations, respectively.
Figure 5B:
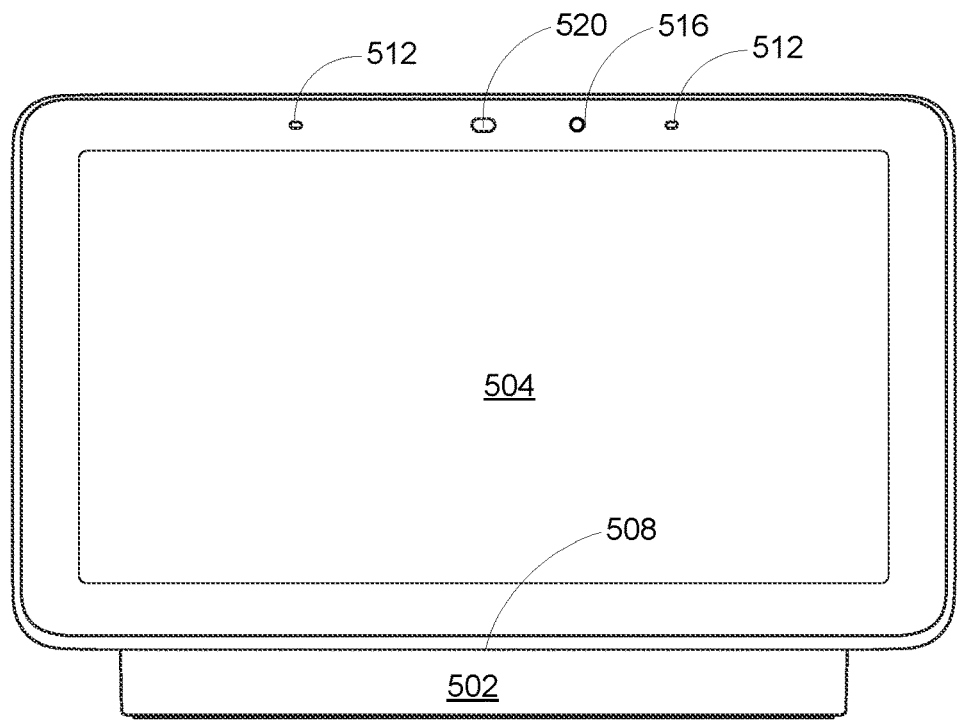
Figure 5C:
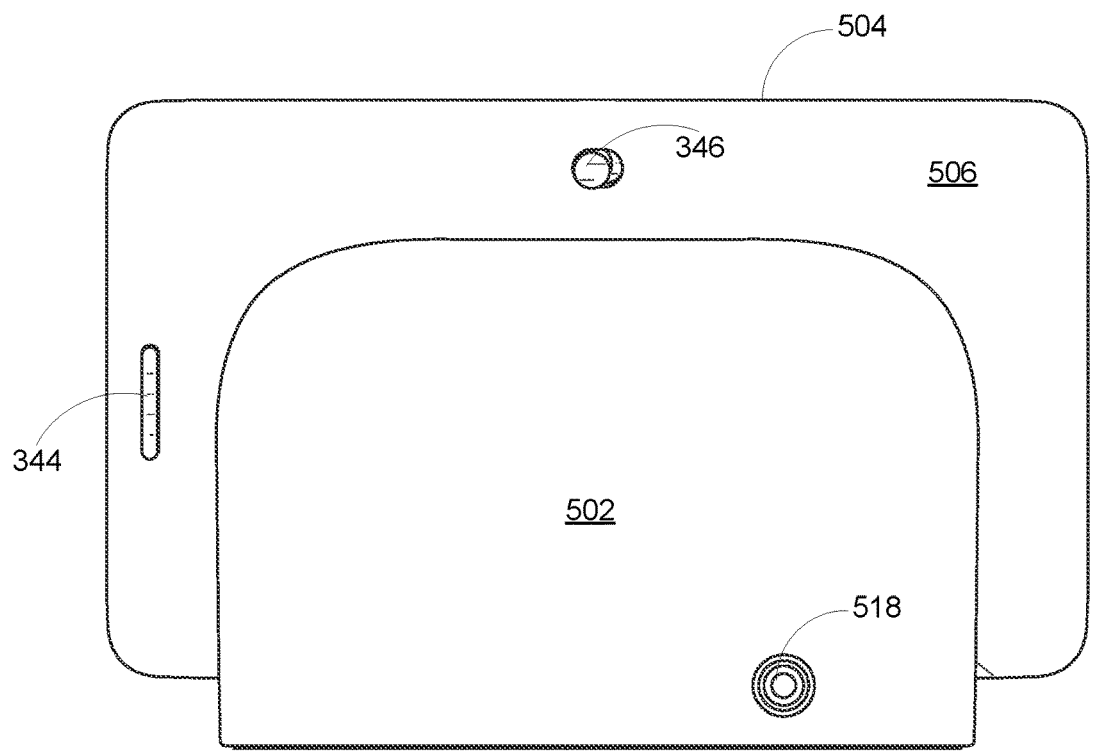

Referring to FIG. 5C, the display assistant device 190 further includes a volume control 344, a privacy control 346 and a power adaptor interface 518. In this example, the volume control button 514 and privacy control 346 are disposed on the rear surface 506 of the screen 504, and the power adaptor interface 518 is disposed on the rear surface 502B of the base 502. The volume control 344 includes a mechanical assembly (e.g., a button, a knob, a switch) configured to receive a user input for adjusting a volume level of the speaker in the display assistant device 190. In an example, the volume control 344 includes two buttons (separated or connected) configured to initiate an increase or decrease of the volume level of the speaker, respectively. In some implementations, the two buttons of the volume control 344 can be pressed concurrently to reset the display assistant device 190, independently of controlling the volume level of the speaker. It is noted that the volume control 344 is not disposed on any edge of the screen 504 of the display assistant device 190. Rather, the volume control 344 is arranged on the rear surface 506 of the screen 504 and has a predefined distance from a short edge of the screen 504, such that when a user grabs the display assistant device 190 by the short edge of the screen 504, the volume control 344 is readily accessible for fingers of the user.

Further, the privacy control 346 disposed on the rear surface 506 is configured to provide privacy protection to a user of the display assistant device 190. For example, the privacy control 346 can mute one or more microphones 342 of the display assistant device 190, and disable the camera(s) 362. In some implementations, activation of the privacy control 346 also disconnects the display assistant device 190 from the Internet while keeping the display assistant device coupled in a local area network, and/or disconnects the display assistant device from all communication networks available to the display assistant device 190. The type of privacy protection enabled by the privacy control 346 could change according to an identity of a person associated with the display assistant device 190 and/or or a time of a specific moment.

In this example of FIG. 5C, the power adaptor interface 518 of the display assistant device 190 is disposed on the rear surface 502B of the base 502. The power adaptor interface 518 includes a female connector to receive a male connector configured to connect the display assistant device 190 to an external power source (e.g., a direct current power source). The display assistant device 190 includes a power board hidden in the base 502. The power board is electrically coupled to the power adaptor interface 518 and configured to drive the display assistant device 190 with the external power source. In some implementations, the display assistant device 190 has to be constantly connected to the external power source, and is powered off when the external power source is disconnected. Alternatively, in some implementations, the power board includes a rechargeable battery. The rechargeable battery is configured to be charged with the external power source, and drive the display assistant device 190 temporarily when the external power source is disconnected from the display assistant device 190.

Figure 5D:
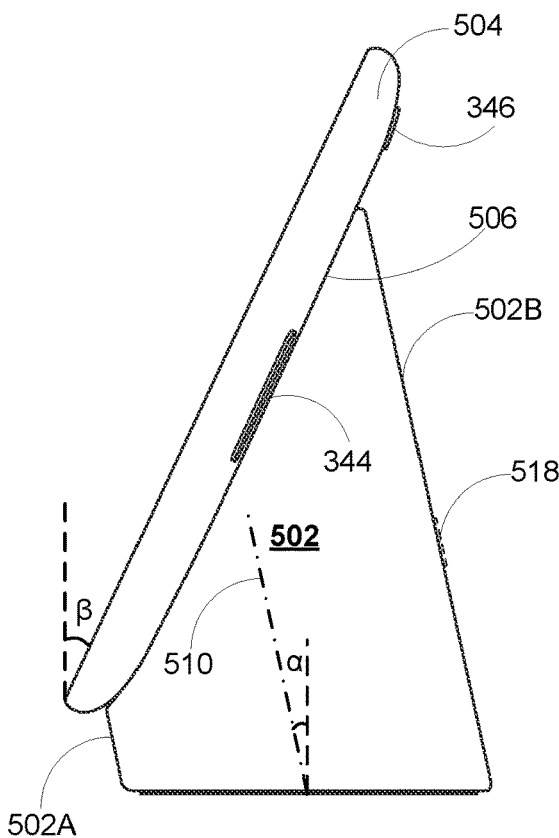
Figure 5E:
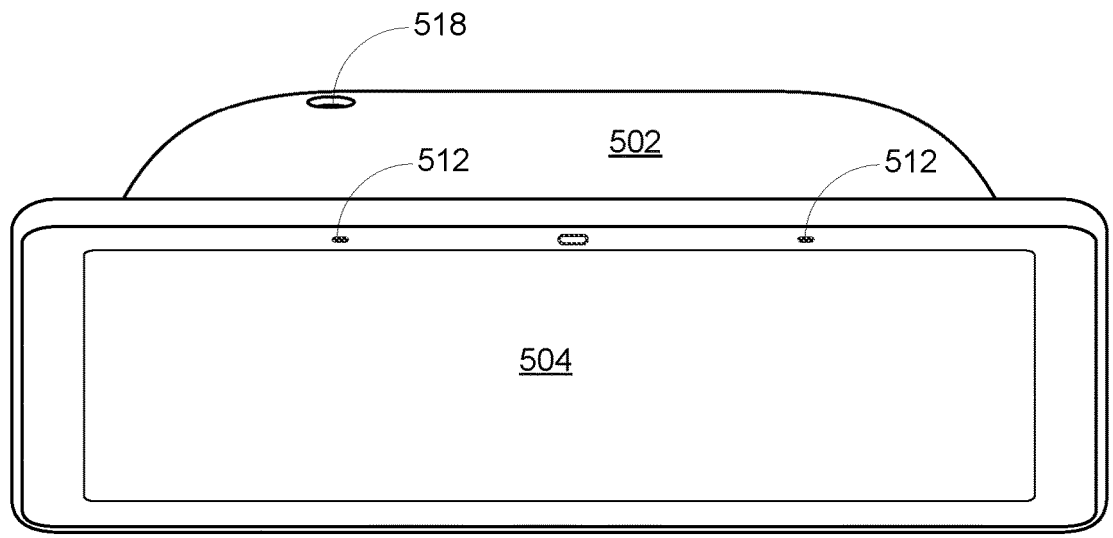
Figure 5F:
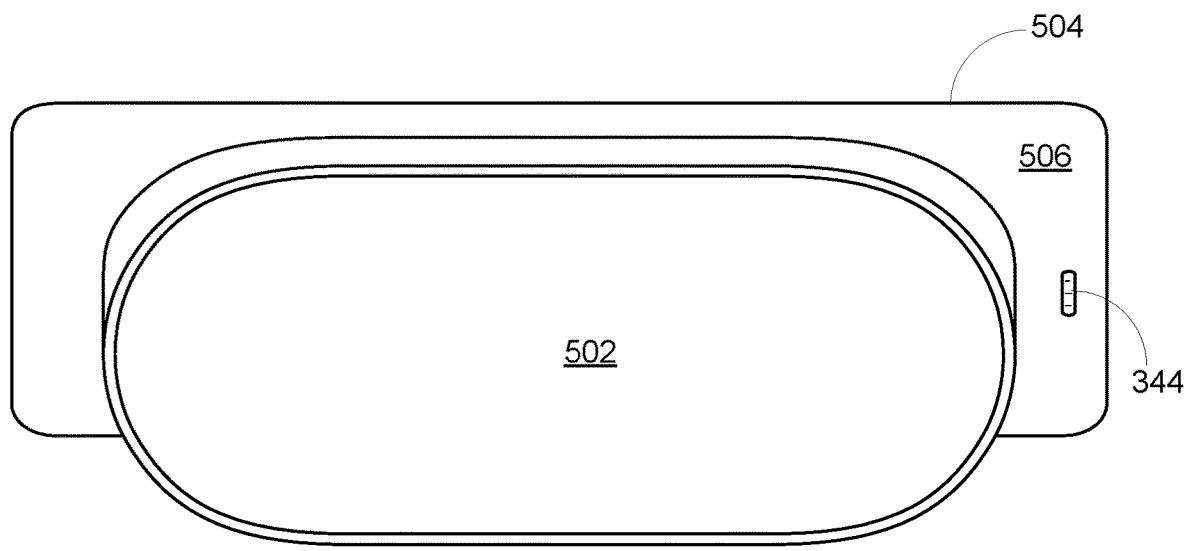

Referring to FIG. 5D, in some implementations, the base 502 extends along a central axis 510, and the central axis 510 of the base 502 is not perpendicular to the surface when the base 502 sits on the surface. Optionally, the base 502 has a front surface 502A and a rear surface 502B both of which are parallel with the central axis 510. The central axis 510, front surface 502A and rear surface 502B of the base 502 lean forward by a base angle α when the base sits on the surface. It is noted that the front surface 502A of the base is shorter than the rear surface 502B of the base, e.g., a height of the front surface 502A is only 20% of that of the rear surface 502B. When the screen 504 is supported by the base 502 at its rear surface 506, the screen 504 is not perpendicular to the surface, but faces substantially forward and leans slightly backward by a screen angle β for the purposes of providing a desirable viewing angle for an average user. In an example, both the base angle α and the screen angle β are equal to 15 degrees, except that the base leans forward by the base angle α of 15 degrees and the screen leans backward by the screen angle β of 15 degrees. By these means, the display assistant device 190 does not tip over (forward or backward) easily when a blunt force F hits a top edge of the display assistant device 190 or a user touch occurs to the screen 202 of the display assistant device 190.

It is noted that FIGS. 5A-5D are focused on an overall look and mechanical features of the display assistant device 190. More details on functions of the display assistant device 190 are described above with reference to FIGS. 1-4.

FIG. 6 is a block diagram illustrating a representative client device 220 (client devices 220 in FIG. 2 and the client device 104 in FIG. 1) associated with a user account in accordance with some implementations. The client device 220, typically, includes one or more processor(s) (e.g., CPUs) 602, one or more network interfaces 604, memory 606, and one or more communication buses 608 for interconnecting these components (sometimes called a chipset). Optionally, the client device also includes a user interface 610 and one or more sensors 690 (e.g., accelerometer and gyroscope). The user interface 610 includes one or more output devices 612 that enable presentation of media content, including one or more speakers and/or one or more visual displays. The user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection component 616, such as a GPS (global positioning satellite) sensor or other geo-location receiver, for determining the location of the client device.

The memory 606 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from one or more processing units 602. The memory 606, or alternatively the non-volatile memory within the memory 606, includes a non-transitory computer readable storage medium. In some implementations, the memory 606, or the non-transitory computer readable storage medium of the memory 606, stores the following programs, modules, and data structures, or a subset or superset thereof:

- an operating system 618 including procedures for handling various basic system services and for performing hardware dependent tasks;

a network communication module 620 for connecting the client device 220 to other systems and devices (e.g., client devices, electronic devices, and systems connected to one or more networks 110) via one or more network interfaces 604 (wired or wireless);

an input processing module 622 for detecting one or more user inputs or interactions from one of the one or more input devices 614 and interpreting the detected input or interaction;

one or more applications 623 for execution by the client device (e.g., games, social network applications, smart home application 624, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices). In some implementations, the user is able to configure settings for the display assistant device 190 using the smart home application 624, including settings for Monitoring (e.g., Live View, Event History, Notifications) on/off Mode, Home/Away Assist, and activity zones. In some implementations, the smart home application 624 enables the user to schedule times that the camera 362 would be activated for home monitoring. In some implementations, the user is enabled to configure the quality of the images and/or video feed, bandwidth to be used, and settings for the microphones 342 via the smart home application 624. In some implementations, the smart home application 624 provides user education (e.g., training videos, manuals, popup message notifications) that moving the display assistant device 190 will distort what does and does not get recorded with activity zones. In some implementations, the smart home application 624 disables zones or adjusts them when the display assistant device 190 is moved around. In some implementations, the display assistant device 190 is configured to send notifications to the cloud (e.g., to the server system 164) when it is moved;

a user interface module 626 for providing and displaying a user interface in which settings, captured data, and/or other data for one or more devices (e.g., smart devices 120, voice-activated display assistant devices 190 in smart home environment 100) can be configured and/or viewed;

a client-side module 628, which provides client-side functionalities for device control, data processing and data review, including but not limited to:
- a device control module 630 for generating control commands for modifying an operating mode of smart devices (e.g., smart devices 120 and display assistant devices 190 and optionally other electronic devices) in accordance with user inputs;
- a video analysis module 632 for analyzing captured video data, e.g., to detect and/or recognize persons, objects, animals, and events;
- a data review module 634 for providing user interfaces for reviewing data from the server system 164 or video sources 222, including but not limited to:
  - an event review module 636 for reviewing events (e.g., motion and/or audio events), and optionally enabling user edits and/or updates to the events; and
  - a persons review module 638 for reviewing data and/or images regarding detected persons and other entities, and optionally enabling user edits and/or updates to the persons data;
- a presentation module 640 for presenting user interfaces and response options for interacting with the smart devices 120 and/or the server system 164; and
- remote interaction module 642 for interacting with a remote person (e.g., a visitor to the smart home environment 100), e.g., via a smart device 120 and/or display assistant device 190 and/or the server system 164; and client data 644 storing data associated with the user account and electronic devices, including, but not limited to:
- account data 646 storing information related to both user accounts loaded on the client device and electronic devices (e.g., of the video sources 501) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.;
- a local data storage 648 for selectively storing raw or processed data associated with electronic devices (e.g., of the video sources 501, such as a doorbell 106), optionally including entity data described previously; and
- prior images 650 such as prior background images and/or entity images captured by camera(s) in various lighting conditions.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, the memory 606, optionally, stores a subset of the modules and data structures identified above. Furthermore, the memory 606, optionally, stores additional modules and data structures not described above.

Figure 7A:
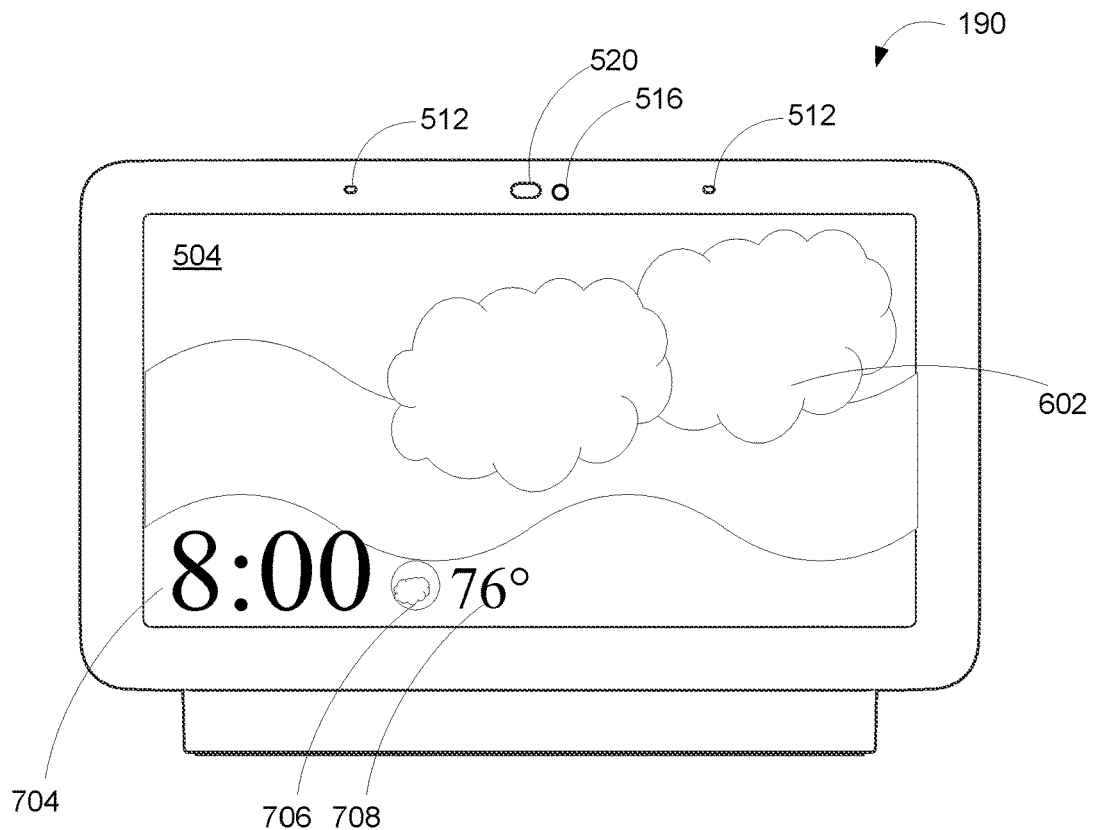
FIGS. 7A-7C are user interfaces of a display assistant device in various device states, in accordance with some implementations.
Figure 7B:
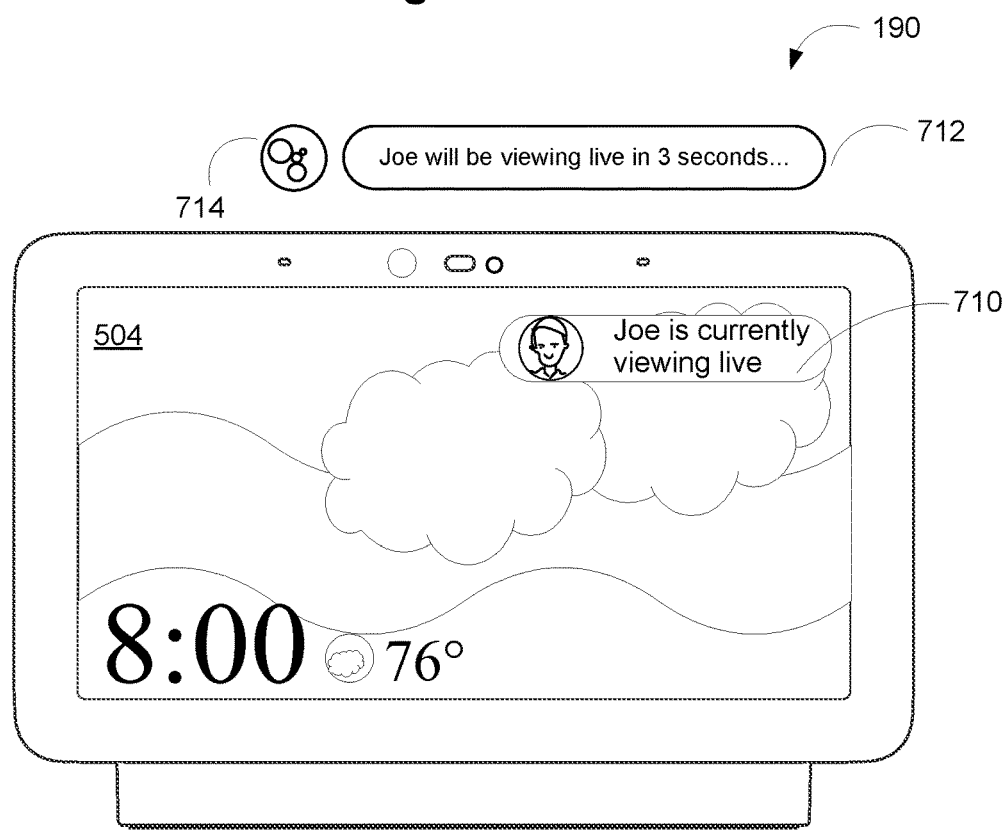
Figure 7C:
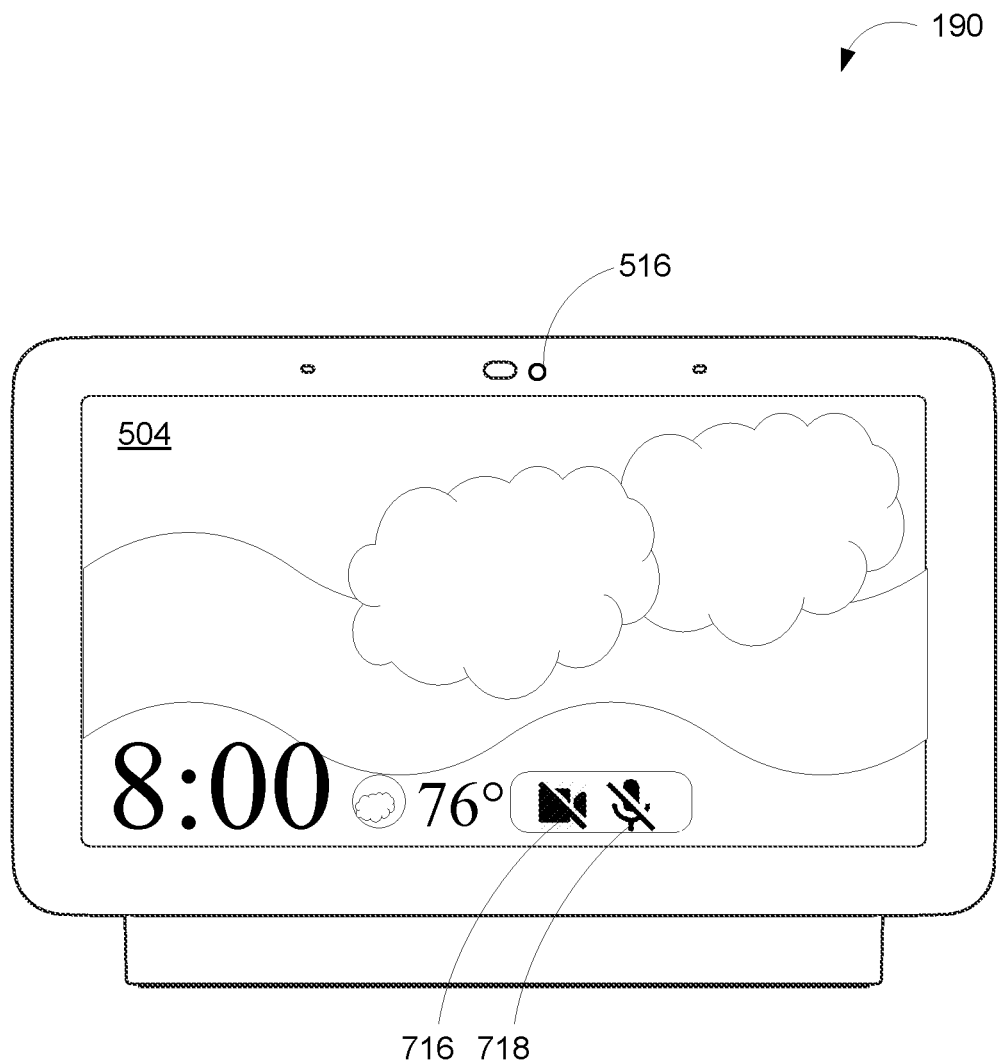
Figure 8A:
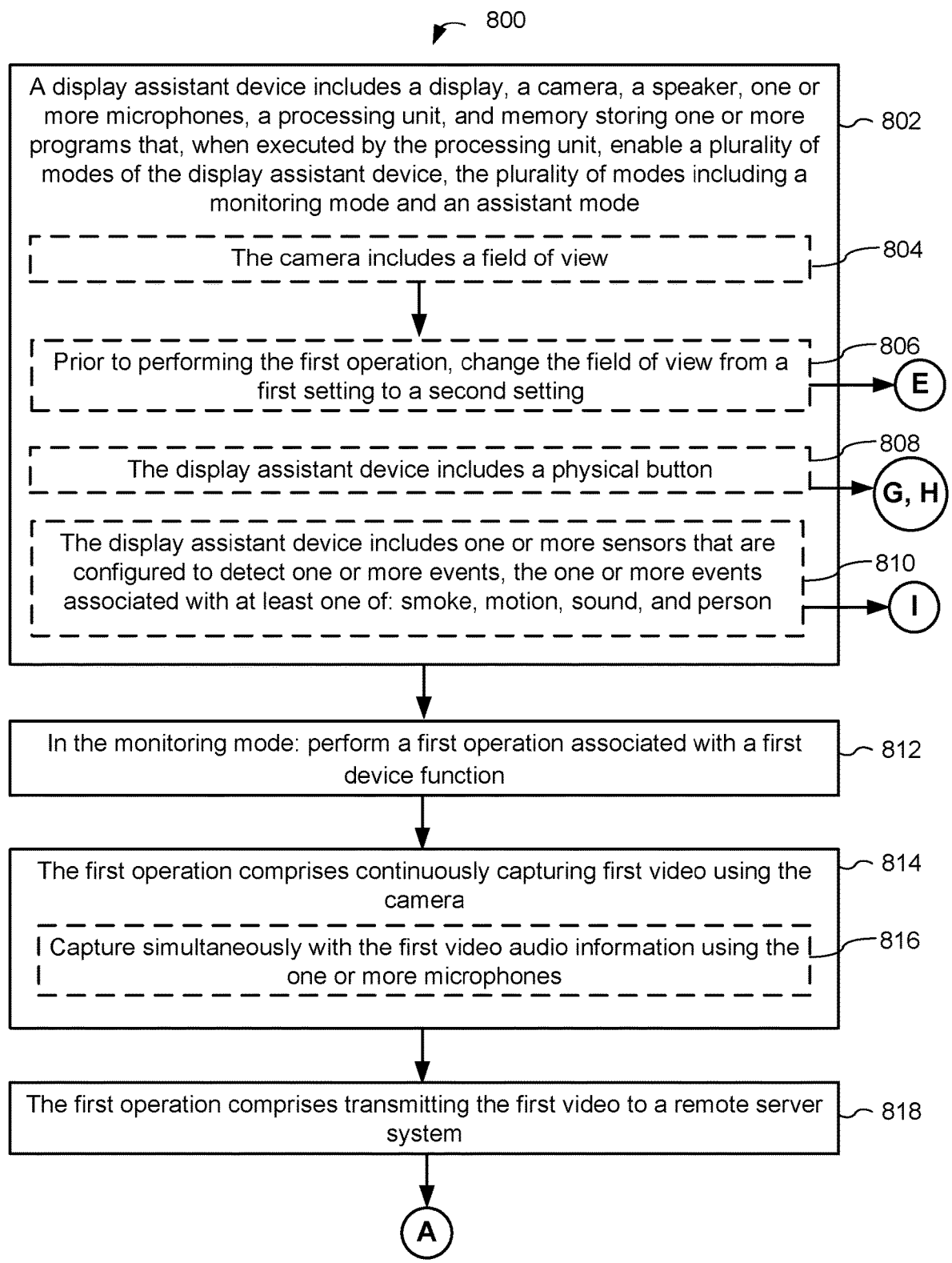
FIGS. 8A-8E illustrate a flowchart representation of a method for providing a plurality of modes at a display assistant device, in accordance with some implementations.
Figure 8B:
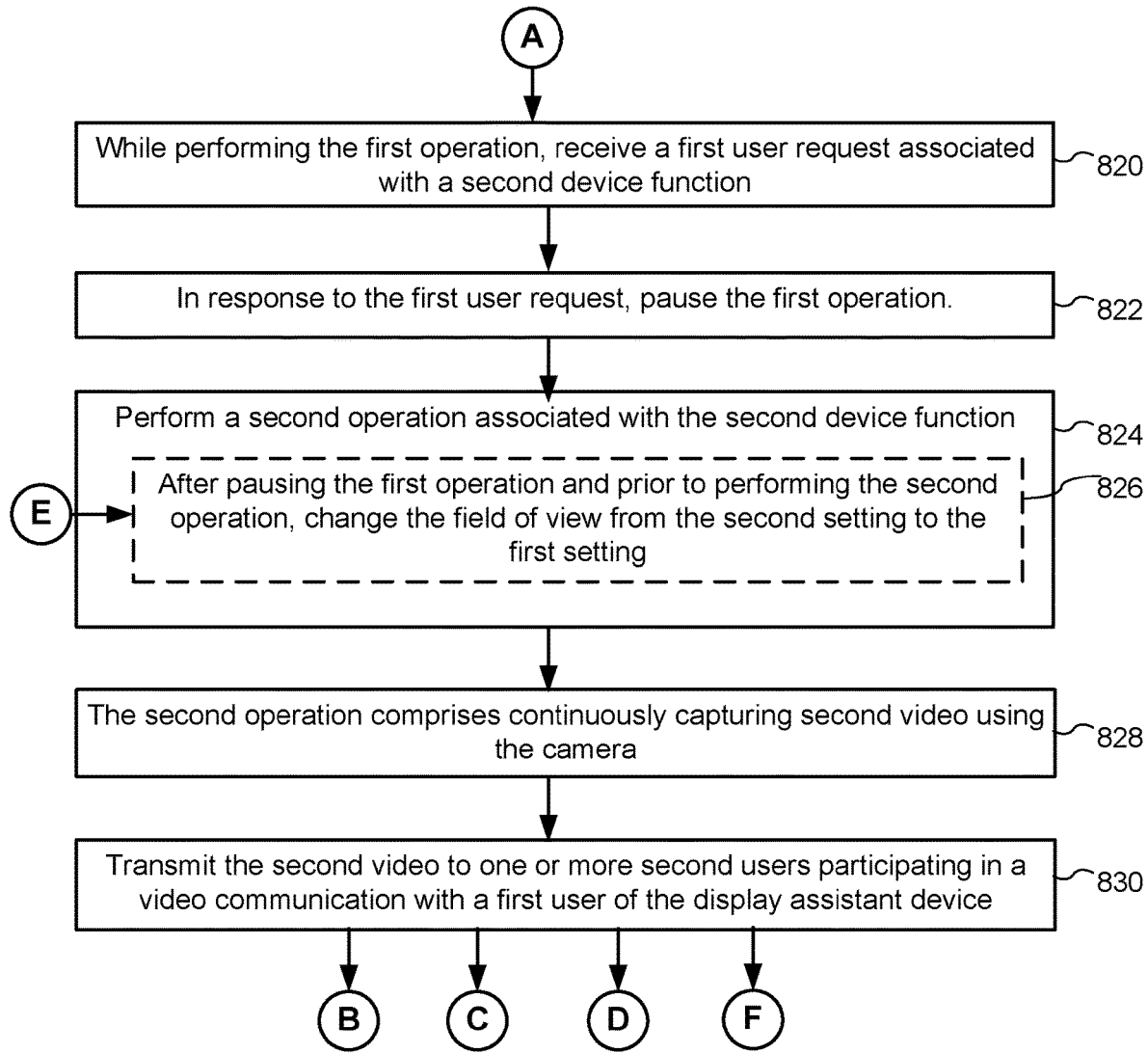
Figure 8C:
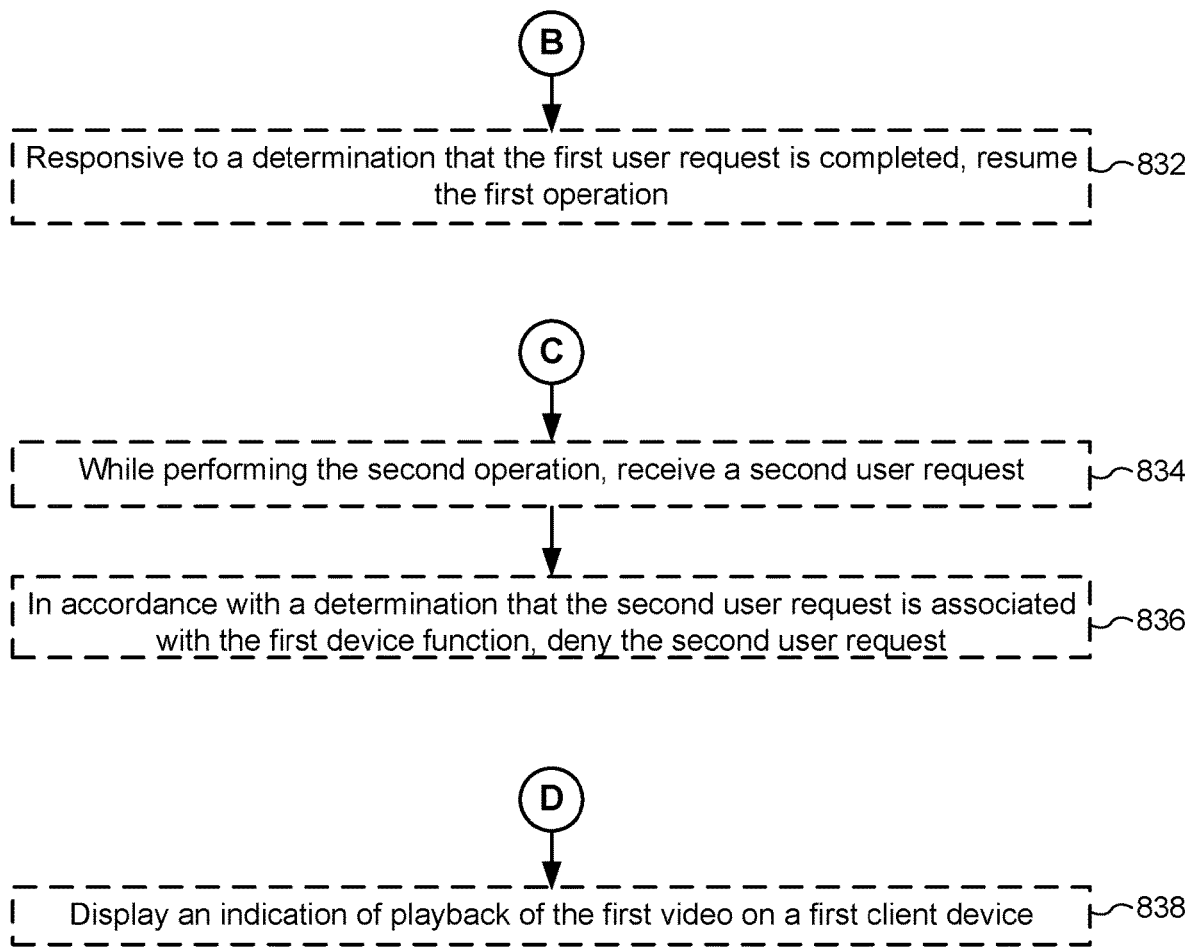
Figure 8D:
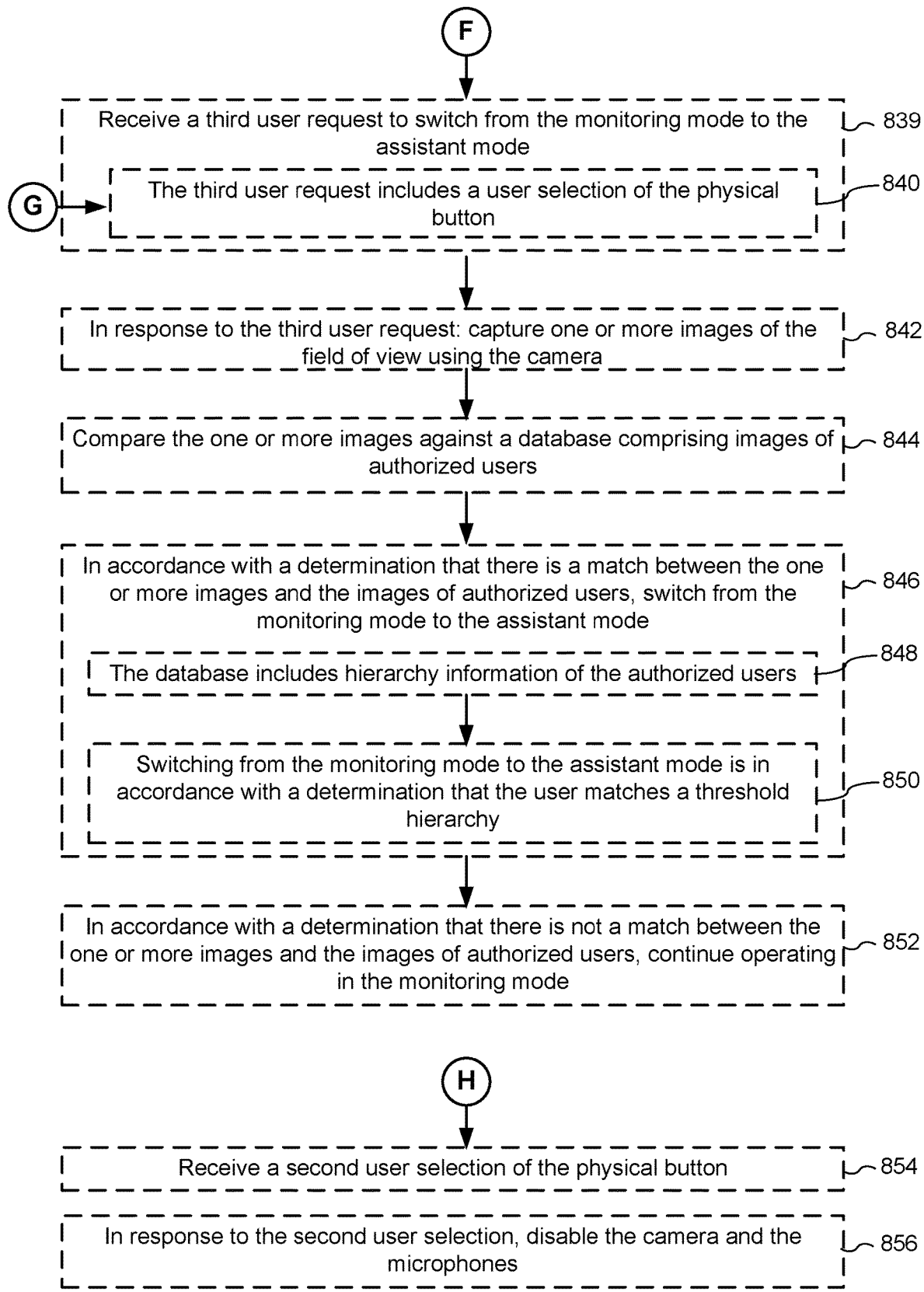
Figure 8E:
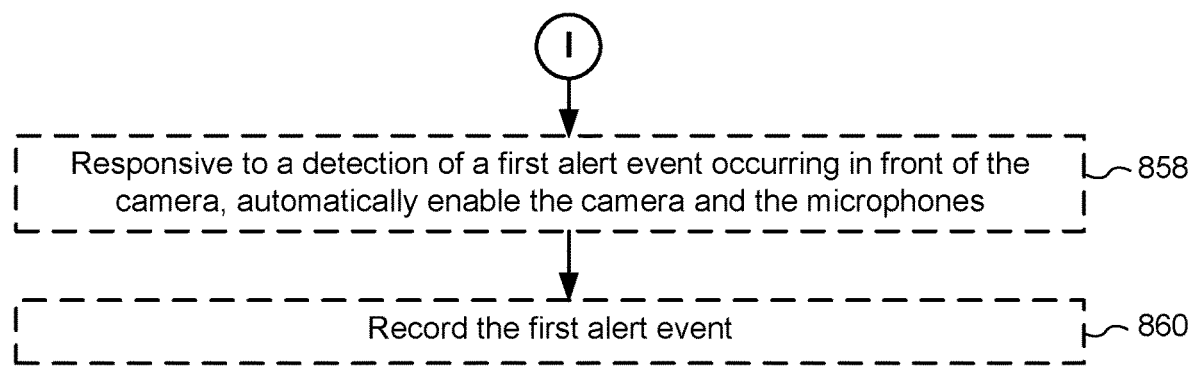

FIGS. 7A-7C illustrate user interfaces of a display assistant device 190 in various device states, in accordance with some implementations.

FIG. 7A illustrates an example view of the display assistant device 190 when it is powered on. In some implementations, the display screen 504 displays an image 702. In some implementations, the image 702 is a default image. In some implementations, the display assistant device 190 is associated with multiple users and the image 702 is customized by user. In some implementations, the display screen 504 also displays information such as a current time 704, a current weather condition 706 (e.g., sunny, partly cloudy, rainy), and a current temperature 708.

In some implementations, the display assistant device is 190 configured to operate in various modes, as described below.

Device Operation Modes

In accordance with some implementations, a display assistant device 190 includes a display (e.g., the display 352 in FIG. 3) with a front facing or screen side and a rear facing side that is opposite the screen. In some implementations, the display assistant device also includes a camera (e.g., the camera 362 in FIG. 3), a speaker (e.g., the speaker(s) 350, FIG. 3), one or more microphones (e.g., the microphones 342, FIG. 3), a processing unit (e.g., the CPU(s) 302, FIG.

3) and memory (e.g., memory 306, FIG. 3). In some implementations, the camera 362 is built-in (e.g., mounted) on the screen side (e.g., screen 504 in FIG. 5) with a field of view facing towards a front side (front view of the display assistant device 190, FIG. 5B). The memory 306 stores one or more programs, the one or more programs including instructions that, when executed by the processing unit 302, enable a plurality of modes of the display assistant device 190 (mode control modules 370). In some implementations, the plurality of modes (modes control modules, 370, FIG. 3) includes a monitoring mode (monitoring module 372, FIG. 3), an assistant mode (assistant module 374, FIG. 3), and a privacy mode (e.g., via the privacy control 346, FIG. 3)

(a) Monitoring Mode

In some implementations, the display assistant device 190 is configured to perform a remote monitoring function in the monitoring mode, in which first video (and audio) is captured (e.g., continuously) by the camera 364 and streamed to a remote server system (e.g., the server system 164) for monitoring uses (e.g., review by an authorized user located remotely from the display assistant device). In some implementations, the server system 164 is associated with a cloud video processing system or a home security monitoring system. In some implementations, the video capture and streaming operations are performed automatically by the display assistant device 190 without requiring interaction by a local user of the display assistant device 190. In other words, there need not be a user at (or using) the display assistant device 190 for video capture and streaming to occur in the monitoring mode. The monitoring uses include transmission of the first video to one or more remote client devices that are authorized to access the first video (e.g., client device 104 in FIG. 1 and client devices 220 in FIG. 2C). Typically, it is only the owner (e.g., a homeowner) of the display assistant device 190, who has created an account associated with the device, who has access to the streaming video. In some implementations, the owner (or homeowner) account is also known as a master account of the display assistant device 190. In some implementations, the owner can also give access to (e.g., add and/or create) "family" member accounts (e.g., accounts for other members of the household) who can then access the streamed video in monitoring mode using their respective authorized devices. As described above, "family" accounts are generally a set of permissions between two or more accounts stored at a remote service (e.g., the server system 164). These permissions enable access to information, such as monitoring of video streams in this instance, and/or control for various things (e.g., control of a smart thermostat in the smart home environment). Family accounts are typically persistent and can be set by device and/or by device functions. In some implementations, access to video content in the monitoring mode is available only to authorized accounts (e.g., a master account and/or a family account).

In some implementations, in the interest of protecting privacy, the display assistant device 190 is configured to perform events based recording (EBR), in which video and audio are usually streamed (e.g., continuously streamed, in substantially real time) to the server system 164 for review by authorized users without recording. In other words, in this mode the video and audio streams are not generally stored on the display assistant device 190 or on the server system 164. In EBR, the display assistant device 190 is configured to start recording when it senses something. In one example, the display assistant device 190 starts recording when it senses a person in the vicinity of the device (e.g., using the presence sensor 360, FIG. 3). In another example, the display assistant device 190 starts recording when it senses (e.g., detects) events, e.g., events that are associated with at least one of: smoke, motion, sound, and person, detected via sensors 363 (FIG. 3). In some implementations, a display assistant 190 can be configured, such that, when EBR is active, a Live View monitoring mode can be initiated to allow an authorized user to have a near real time view of output from the display assistant's camera, so as to provide the user a view of the event.

In some implementations, the transmission of the first video to the remote client devices occurs at substantially the same time as the video capture. In other words, in the monitoring mode, the remote client devices 220 are able to view in near real time a live video (and audio) feed captured concurrently by the display assistant device. This capability is sometimes referred to herein as "Live View." Additionally, in some implementations, the captured video is stored (e.g., at the video storage database 210) for subsequent processing and/or future access.

In some implementations, in the interest of protecting user privacy, Live View operation of the display assistant device 190 is only possible when an authorized user has enabled the display assistant device 190 for such operation. For example, in some implementations, the display assistant device 190 includes a physical switch or button (e.g., the privacy control 346, FIG. 3) that can be physically set to a "privacy" position that disables the camera 362 and the microphones 342. In such implementations, Live View operation is enabled only when the privacy control 346 is physically set to a position in which the camera and microphones are enabled. In some implementations, even when the camera and microphones of the display assistant device are enabled for Live View operation, such operation can be disabled via device settings that can be set by an authorized user via software executing on the display assistant device or on a client device 220. In some implementations, a wide range of display assistant device settings, including the privacy setting, are stored at a server in conjunction with an account of an authorized user of the display assistant device.

In some implementations, the display assistant device 190 will not record activity or send event notifications and corresponding metadata without additional configuration in the client device 220 (e.g., on the smart home application 624, FIG. 6). In some implementations, a user of the client device 220 obtains a view of the video and audio stream recorded by the display assistant device 190 by activating an affordance on the client device (e.g., on the smart home application 624, FIG. 6). In some implementations, the smart home application 624 may also provide an indication to the user that the physical switch on the display assistant device 190 needs to be activated before the user can access the live stream. In some implementations, the smart home application 624 is configured to initiate a close-up tracking view when motion activity is detected by the camera 362 of the display assistant device 190.

In some implementations, the user may interact with the client device 220 via the smart home application 624 to obtain a magnified (e.g., zoomed in) view of the video feed (e.g., up to 8×) captured by the camera 362 of the display assistant device 190.

In some implementations, the user of the client device 220 may interact with a person in the smart home environment 100, including a person that has been captured on the video stream (e.g., via camera 362 of the display assistant device 190), by initiating a "Talk and Listen" session (e.g., talkback) session with the display assistant device 190 using an affordance on the application 624. The display assistant device 190 may display one or more visual and/or audio indicators signaling the start of the talk and listen session. For security reasons, the person in the smart home environment 100 is not required to accept the talkback session for communication to begin. In some implementations, sound playback (e.g., including timers/alarms) on the display assistant device 190 will temporarily pause when Talk and Listen is initiated and will resume when the Talk and Listen session ends. In some implementations, the display assistant device 190 includes assistant text-to-speech (TTS) capabilities, which will be stopped when Talk and Listen sessions interrupt.

In some implementations, the display assistant device 190 continues to operate as a voice-activated assistant device during a Talk and Listen session. For example, the user and/or the person(s) in the smart home environment 100 may continue to issue voice commands (e.g., hotwords) to the display assistant device 190 during a Talk and Listen Session and the display assistant device 190 may playback other sounds before the Talk and Listen Session ends.

In some implementations, the smart home application (application 624, FIG. 6) is configured to maintain a full screen view of video from the display assistant device while zooming (e.g., smart framing) into a portion of interest of the camera's field of view in a picture-in-picture window within the full frame. For example, the portion of interest can include video of an object in motion or video of a person of interest (either known or unknown). In some implementations, the user of the client device 220 may also initiate a close-up tracking view when motion is detected, in which case zoomed video of the person or object in motion is presented in a picture-in-picture window, presented in the full frame view while the larger scene is presented in a picture-in-picture window, or shown in the full screen with no picture-in-picture window.

In some implementations, the remote monitoring function is disabled by deactivating a physical switch (e.g., privacy control 346, FIG. 3) on the display assistant device 190, which in turn deactivates the monitoring mode on the smart home application (smart home application 624, FIG. 6).

In some implementations, Live View operation is deactivated by deactivating the physical switch (e.g., privacy control 346, FIG. 3) on the display assistant device 190. In some implementations, the deactivating the physical switch disables the monitoring mode of In some implementations, the display assistant device 190 includes one or more indicator light(s) 353 (FIG. 3) (e.g., status LEDs) that are configured to display a visual indication of the status of the camera(s) 362, including an operating mode of the display assistant device 190. In one instance, the indicator lights 353 may be illuminated with a color (e.g., green) when the display assistant device 190 is actively sending video and/or event notifications to the remote server system 164 (e.g., in Monitoring mode). In another instance, the indicator lights 353 may be illuminated with a color (e.g., green) and pulsing (e.g., flashing) when the camera feed of the display assistant device 190 is actively being viewed by a person (e.g., in Live View mode). In some implementations, the brightness of the indicator lights is configured to be adaptive. In other words, the brightness level of the lights is automatically adjusted based on ambient light (e.g., brighten at day, dim at night). In some implementations, visual indicators are also provided in the client device 220 (e.g., on the smart home application 624) to indicate the operating mode of the display assistant device 190. In some implementations, the status LED is not illuminated when the device 190 is sensing, but no video is being sent to the cloud—i.e., all event processing is being done locally, on the device 190.

In some implementations, and as illustrated in FIG. 7B, the display assistant device 190 is configured to display one or more visual indicators 710 on the screen 504 (e.g., "Joe is currently viewing live") to indicate that a remote person is (actively) viewing the scene captured by the cameras 362. In some implementations, this display of visual one or more visual indicators on the screen accompanies illumination of the indicator lights 353 as described above. In some implementations, the display assistant device 190 is configured to play an audible chime 714 (e.g., audio, a sound) before the remote person starts viewing the scene (e.g., the chime may be played 10 seconds, 5 seconds, and/or 3 seconds before Live View commences on the client device 220). In some implementations, the display assistant device 190 is configured to broadcast an audio message, and/or display a message 712 on the screen 504, to indicate that a person is about to view a live scene captured by the camera 352.

In some implementations, the display assistant device 190 does not include a setting to turn status lights off due to privacy risk. In some implementations, the display assistant device 190 does not include a setting to turn off the chime and the audio/display broadcast off due to privacy risk.

In some implementations, the display assistant device 190 is configured to perform a video communication function (e.g., videoconferencing and video chats) in the monitoring mode (video chat 376, FIG. 3).

In some implementations, monitoring mode interoperates with all features of the display assistant device 190 except video communication (e.g., Duo call). In some instances, the display assistant device 190 is configured to temporarily disable (e.g., pause) the monitoring function when performing the video communication function in the monitoring mode. In one instance, incoming calls (e.g., video, audio, public switched telephone network (PSTN) would ring on the display assistant device 190 and if answered, the device would pause recording and access to Live View. In another instance, outgoing calls automatically pause recording and access to Live View. In another instance, video communication message recording and playback will automatically pause recording and access to Live View functionality. One reason for the temporary disablement of the monitoring function during video communication is the significant complexity in maintaining various simultaneous streams for video communication, smart framing, and monitoring, that all require their own resolutions, field of view and camera/image rotations. Another reason is respect for user privacy. Accordingly, the display assistant device 190 is configured to not record the other end of a video communication call in monitoring mode. In some implementations, the display assistant device 190 is configured to suppress monitoring event recordings during a video communication call. In some implementations, the display assistant device is configured to provide a user with Live View functionality on the device 190 while the user is engaged in a Duo call.

In some implementations, the Talk and Listen capability is temporarily disabled during video communication.

In some instances, the monitoring function automatically resumes (e.g., re-enabled) when the video communication function is completed.

In some implementations, if a remote user attempts to activate the remote monitoring function on the display assistant device 190 while it is being used for a video communication function, the user will be notified (e.g., via the smart home application) that the device is being used in a call, and the monitoring function will be enabled after the video communication concludes. In some implementations, the smart home application attempts to reconnect to the display assistant device 190 at predefined time intervals (e.g., every minute, every three minutes) to enable the monitoring function (live view). In some implementations, the server system 164 notifies the client device 220 that the display assistant device 190 has completed the video communication function and is available to perform the monitoring function. Further details of the operations are described in the flowchart in FIG. 8.

In some implementations, when the display assistant device 190 is performing the remote monitoring function, calls (e.g., audio and/or video calls) in/out of the display assistant device 190 are disabled. In other words, if a remote user attempts to enable the monitoring function from the smart home application while the display assistant device 190 is in a call, the user will be prompted to confirm termination of the call to enable monitoring. Alternatively, the user will be prompted to allow the Duo call to conclude before automatically enabling the monitoring function.

In some implementations, the display assistant device 190 includes a setting for the video communication function to override the remote monitoring function temporarily.

In some implementations, the display assistant device 190 is configured to perform the monitoring function and the video communication function concurrently. In other words, a remote user can view live feed on the display assistant device 190 it is being used for video communication.

In some implementations, the display assistant device 190 includes an option to toggle Monitoring mode on/off from the display screen 504.

In some implementations, the display assistant device 190 is configured to perform a face match (e.g., face recognition) function in the monitoring mode, in which one or more images captured by the camera 362 are compared against a database of images of authorized users (e.g., authorized persons database 242, FIG. 4). For example, the display assistant device 190 may detect a person proximate to the device via the presence sensor 360, and records one or more images of that person via camera 362. In accordance with a determination that there is a match between the images of that person and a database of images (e.g., authorized persons database), the display assistant device 190 determines that the person is an authorized user of the device 190. It is configured to unlock itself to enable further interactions with the authorized user. In some implementations, the display assistant device 190 configures an operation of the device in accordance with the authorized user. In some implementations, the display assistant device 190 is configured to send alert notifications to authorized client devices 220 in accordance with a determination that there is not a match.

In some implementations, the face match is performed locally on the display assistant device. In other words, the one or more images captured by the camera 362 are compared against data stored locally (e.g., authorized users data 338 in the display assistant device data 330 FIG. 3) on the display assistant device 190, and the device is configured to unlock itself in accordance with a match.

In some implementations, the display assistant device 190 is further configured to curate content for the user that has been identified based on the face match in the monitoring mode.

In some implementations, the display assistant device is configured to interoperate the remote monitoring function with the face recognition function.

In some implementations, the display assistant device is configured to interoperate the remote monitoring function with the content curation function.

In some implementations, the display assistant device 190 includes one or more sensors (e.g., sensors 363) that are configured to detect one or more events associated with at least one of: smoke, motion, sound, and person. The display assistant device 190 is configured to capture a third video in response to detection of the one or more events. In some implementations, the display assistant device 190 is configured to perform the event detection and capture in the monitoring mode and/or the assistant mode. In some implementations, the display assistant device 190 is configured to receive alert events that are detected by other smart devices 120 to which it is communicatively coupled. In response to the alert events, the display assistant device 190 activates the camera 36 and/or microphones 342 to capture video of the smart home environment 100.

(b) Assistant Mode (Monitoring Off Mode)

In accordance with some implementations, the display assistant device 190 is configured to perform a second plurality of functions in the assistant mode. The second plurality of functions excludes the remote monitoring function. In some implementations, the second plurality of functions includes a video communication function (e.g., a Duo call or videoconferencing function) in which second video captured by the camera 364 is transmitted (e.g., via one or more private communication channels) to one or more second users (e.g., second devices 230, FIG. 2D) participating in a video communication with a first user who is in proximity to the display assistant device 190. The first user is in proximity to the display assistant device 190 and the one or more second users are users whom the two-way chat have been initiated. Unlike the monitoring mode, in which video and audio feed are accessible only to authorized users (e.g., family account members), the one or more parties involved in the video communication function (e.g., Duo call or videoconferencing function) need not be an authorized user. Typically, the one or more second users involved in the video communication are associated with accounts that are unrelated (e.g., unauthenticated) to the first user and unrelated to the household. The second devices 230 are distinct from the remote client devices 220. In case of a video communication, access to the video stream by the one or more second users is only a temporary permission that lasts for the duration of the call.

In some implementations, the second plurality of functions includes the face recognition (e.g., face matching) function.

In some implementations, the second plurality of functions includes a content curation function. In some implementations, content is curated in accordance with the identity of the user that has been identified based on the face match.

In some implementations, the display assistant device 190 is configured to perform the event detection and capture that is described above in the assistant mode.

(c) Privacy Mode

In some implementations, the plurality of modes includes a privacy mode in which the camera 362 and the microphones 342 are disabled. In some instances, the display assistant device 190 includes a physical switch (e.g., the privacy control switch 346 or another button/switch) that is configured to enable or disable the privacy mode. FIG. 7C illustrates visual indications 716 and 718 on the screen 504 indicating that the camera 362 is disabled and the microphones 342 are muted in the privacy mode. In some implementations, the one or more status indicator lights 516 may be illuminated with a color (e.g., amber) to indicate that the display assistant device 190 is operating in the privacy mode.

In some implementations, the display assistant device 190 is disconnected from the Internet while in the privacy mode. In some implementations, the display assistant device 190 is disconnected from the Internet and remains coupled in a local area network while in the privacy mode. In some implementations, the display assistant device 190 is disconnected from all communication networks available to the display assistant device 190 while in the privacy mode.

In some implementations, the remote monitoring function, the video communication function, and the face match (e.g., face recognition) function are disabled while the assistant device 190 is in the privacy mode.

In some implementations, a user needs to physically turn the privacy control switch 346 on to activate the display assistant device 190 to resume operation in the monitoring mode and the assistant mode.

In some implementations, the display assistant device 190 is configured to perform a face match on the person who has activated the button for privacy mode. The display assistant device switches to privacy mode after it has been determined that the person who requested the privacy mode is an authorized user of the device.

Flowchart

FIGS. 8A-8E are flow diagrams illustrating a method 800 for operating a display assistant device 190 in a plurality of modes that is performed at the display assistant device 190, in accordance with some implementations. It is noted that many of the control functions claimed herein can also be performed at a remote server, such as the remote server system 164.

In accordance with some implementations, the method 800 is performed at a display assistant device 190. The display assistant device includes (802) a display (display 352, FIG. 3), a camera (camera 362, FIG. 3), a speaker (speaker(s) 350, FIG. 3), one or more microphones (microphones 342, FIG. 3), a processing unit (CPU(s) 302, FIG. 3), and memory (memory 306, FIG. 3) storing one or more programs. The one or more programs, when executed by the processing unit, enable a plurality of modes of the display assistant device. The plurality of modes includes a monitoring mode and an assistant mode.

In the monitoring mode, the display assistant device 190 performs (812) a first operation associated with a first device function. In some implementations, the first device function is a remote monitoring function.

The first operation comprises (814) continuously capturing first video (e.g., first video of a premises or first video of the smart home environment 100) using the camera 362.

In some implementations, the display assistant device 190 captures (816) with the first video audio information using the one or more microphones 342.

The first operation comprises (818) transmitting (e.g., continuously or simultaneously transmitting) the first video to a remote server system, such as the server system 164 as illustrated and described in FIGS. 1, 2, and 4.

While (e.g., during) performing the first operation, the display assistant device 190 receives (820) a first user request associated with a second device function. In some implementations, the second device function is a video communication (e.g., a duo call) function.

In response to the first user request, the display assistant device 190 pauses (822) the first operation.

The display assistant device 190 performs (824) a second operation associated with the second device function.

The second operation comprises (828) continuously capturing second video using the camera 362.

The display assistant device 190 transmits (830) the second video to one or more second users participating in a video communication with a first user of the display assistant device 190.

In some implementations, responsive (832) to a determination that the first user request is completed, the display assistant device 190 resumes the first operation.

In some implementations, while (834) (e.g., during) performing the second operation, the display assistant device 190 receives a second user request. In accordance with a determination (836) that the second user request is associated with the first device function (e.g., remote monitoring function), the display assistant device 190 denies the second user request. As explained above in the monitoring mode operation of the display assistant device 190, there is significant complexity in maintaining various simultaneous streams for video communication, smart framing, and monitoring. Furthermore, denying a remote monitoring function during video communication ensures respect for user privacy.

In some implementations, the display assistant device 190 displays (838) an indication of playback of the first video on a first client device.

In some implementations, the camera 362 includes (804) a field of view. The method 800 further comprises: prior to performing (806) the first operation, changing the field of view from a first setting to a second setting. In some implementations, the first setting is a default setting, such as the default setting in FIG. 5D, wherein the screen 504 is not perpendicular to the surface, but faces substantially forward and leans slightly backward by a screen angle β for the purposes of providing a desirable viewing angle for an average user. In some implementations, changing the field of view from the first setting to the second setting includes adjusting a tilt angle of the camera 362 using software affordances such as filters 361 (FIG. 3. Additionally, or alternatively, changing the field of view from the first setting to the second setting includes changing a tilt angle of the display (e.g., changing the screen angle β from 15 degrees to zero degree) using mechanical means (not shown).

In some instances, after pausing the first operation (826) and prior to performing the second operation, the display assistant device 190 changes the field of view from the second setting to the first setting, using the filters 361 and/or by adjusting the tilt angle of the display.

In some implementations, the method 800 further comprises receiving (839) a third user request to switch from the monitoring mode to the assistant mode. In response to the third user request, the display assistant device 190 captures (842) one or more images of the field of view using the camera 362. The display assistant device 190 compares the one or more images against a database (e.g., the authorized persons database 242, FIGS. 2E and 4) comprising images of authorized users of the display assistant device 190. In accordance with a determination (846) that there is a match between the one or more images and the images of authorized users, the display assistant device 190 switches from the monitoring mode to the assistant mode.

In some implementations, the display assistant device 190 includes (808) a physical button. In some implementations, the physical button is the privacy control button 346 in FIG. 3. In some implementations, the display assistant device 190 includes additional physical button(s) that are distinct from the privacy control button 346 shown in FIGS. 3 and 5.

In some instances, the third user request is initiated from the display assistant device 190, for example by a user pressing the physical button (e.g., the privacy control button 346 in FIG. 3). The physical button is a toggle button that, when pressed, toggles between the monitoring mode and the assistant mode.}

In some instances, in accordance with a determination (852) that there is not a match between the one or more images and the images of authorized users, the display assistant device 190 continues operating in the monitoring mode.

In some instances, the database (e.g., the authorized persons database 242) includes (848) hierarchy information of the authorized users. The switching from the monitoring mode to the assistant mode is in accordance with a determination (850) that the user matches a threshold hierarchy.

In some instances, the display assistant device includes (810) one or more sensors (e.g., sensors 363, FIG. 3) that are configured to detect one or more events, the one or more events associated with at least one of: smoke, motion, sound, and person. The method 800 further comprises responsive (858) to a detection of a first alert event occurring in front of the camera, automatically enabling the camera 362 and the microphones 342 and (860) recording the first alert event. Additionally and/or alternatively, in some implementations, the display assistant device 190 is configured to receive alert events that are detected by other smart devices 120 to which it is communicatively coupled. In response to the alert events, the display assistant device 190 activates the camera 362 and/or microphones 342 to capture video of the smart home environment 100.

In accordance with some implementations, an electronic device (e.g., the display assistant device 190) includes: one or more processors; and memory coupled to the one or more processors, the memory storing one or more programs configured to be executed by the one or more processors, the one or more programs including instructions for performing any of the above methods and/or operations.

In accordance with some implementations, a non-transitory computer-readable storage medium (e.g., within the memory 306) stores one or more programs, the one or more programs comprising instructions, which when executed by the display assistant device 190, cause the device to perform any of the above methods and/or operations.

The present application discloses subject matter in correspondence with the following numbered clauses.

Clause 1. A display assistant device, comprising: a display; a camera; a speaker; one or more microphones; a processing unit; and memory storing one or more programs, the one or more programs comprising instructions that, when executed by the processing unit, enable a plurality of modes of the display assistant device, the plurality of modes including a monitoring mode and an assistant mode, wherein:

in the monitoring mode, the display assistant device is configured to perform a remote monitoring function in which first video captured by the camera is streamed to a remote server system for monitoring uses, wherein the monitoring uses include transmission of the first video to one or more remote client devices authorized to access the first video;

in the assistant mode, the display assistant device is configured to perform a second plurality of functions, the second plurality of functions excluding the monitoring function and including a video communication function in which second video captured by the camera is transmitted to one or more second devices participating in a video communication with a first user of the display assistant device, the one or more second user devices distinct from the one or more remote client devices Clause 2. The display assistant device of clause 1, wherein the one or more remote client devices are devices authorized by an owner of a master account associated with the display assistant device.

Clause 3. The display assistant device of clause 1 or clause 2, further configured to perform the video communication function in the monitoring mode Clause 4. The display assistant device of clause 3, further configured to temporarily disable the monitoring function when performing the video communication function in the monitoring mode.

Clause 5. The display assistant device of any of clauses 1 to 4, further configured to: perform a face match function in which one or more images captured by the camera are compared against a database of images of authorized users; and configure an operation of the display assistant device in accordance with a match between the one or more images and the database of images Clause 6. The display assistant device of clause 5, further configured to perform the face match function in the monitoring mode and in the assistant mode.

Clause 7. The display assistant device of any of clauses 1 to 6, wherein the plurality of modes includes a privacy mode in which the one or more microphones and the camera are disabled.

Clause 8. The display assistant device of any of clauses 1 to 7, further comprising a physical switch configured to enable or disable the monitoring mode.

Clause 9. The display assistant device of any of clauses 1 to 8, further comprising a privacy switch configured to enable one of a group of privacy operations consisting of: muting a microphone of the display assistant device, disabling a camera mode, disconnecting the display assistant device from the Internet while keeping the display assistant device coupled in a local area network, and disconnecting the display assistant device from all communication networks available to the display assistant device.

Clause 10. The display assistant device of any of clauses 1 to 9, further comprising an indicator light configured to display a visual indication of a status of the camera, including an operation mode of the device.

Clause 11. The display assistant device of any of clauses 1 to 10, further comprising one or more sensors that are configured to detect one or more events associated with at least one of: smoke, motion, sound, and person; and the display assistant device is configured to capture a third video in response to detection of the one or more events.

Clause 12. A method performed at a display assistant device, the display assistant device including a display, a camera, a speaker, one or more microphones, a processing unit, and memory storing one or more programs that, when executed by the processing unit, enable a plurality of modes of the display assistant device, the plurality of modes including a monitoring mode and an assistant mode, the method comprising: (1) in the monitoring mode: (a) performing a first operation associated with a first device function, the first operation comprising: (i) continuously capturing first video using the camera; and (ii) transmitting the first video to a remote server system; while performing the first operation, receiving a first user request associated with a second device function; in response to the first user request: (3) pausing the first operation; and (3) performing a second operation associated with the second device function, the second operation comprising: (a) continuously capturing second video using the camera; and (b) transmitting the second video to one or more second users participating in a video communication with a first user of the display assistant device Clause 13. The method of clause 12, further comprising: responsive to a determination that the first user request is completed, resuming the first operation.

Clause 14. The method of any of clauses 12 to 13, further comprising: while performing the second operation, receiving a second user request; and in accordance with a determination that the second user request is associated with the first device function, denying the second user request.

Clause 15. The method of any of clauses 12 to 14, further comprising: displaying an indication of playback of the first video on a first client device Clause 16. The method of any of clauses 12 to 15, wherein the camera includes a field of view, the method further comprising: prior to performing the first operation, changing the field of view from a first setting to a second setting Clause 17. The method of clause 16, further comprising: after pausing the first operation and prior to performing the second operation, changing the field of view from the second setting to the first setting.

Clause 18. The method of any of clauses 12 to 17, further comprising: receiving a third user request to switch from the monitoring mode to the assistant mode; and in response to the third user request: capturing one or more images of the field of view using the camera; comparing the one or more images against a database comprising images of authorized users; and in accordance with a determination that there is a match between the one or more images and the images of authorized users, switching from the monitoring mode to the assistant mode.

Clause 19. The method of clause 18, wherein the display assistant device includes a physical button; and the third user request includes a user selection of the physical button.

Clause 20. The method of clause 18 or clause 19, further comprising: in accordance with a determination that there is not a match between the one or more images and the images of authorized users, continuing operating in the monitoring mode.

Clause 21. The method of clauses 18 to 20, wherein the database includes hierarchy information of the authorized users; and the switching from the monitoring mode to the assistant mode is in accordance with a determination that the user matches a threshold hierarchy.

Clause 22. The method of any of clauses 12 to 21, wherein the display assistant device includes a physical button, the method further comprising: receiving a second user selection of the physical button; and in response to the second user selection, disabling the camera and the microphones.

Clause 23. The method of any of clauses 12 to 22, wherein the display assistant device includes one or more sensors that are configured to detect one or more events, the one or more events associated with at least one of: smoke, motion, sound, and person, the method further comprising: responsive to a detection of a first alert event occurring in front of the camera: automatically enabling the camera and the microphones; and recording the first alert event.

Clause 24. The method of any of clauses 12 to 23, wherein performing the first operation includes: capturing simultaneously with the first video audio information using the one or more microphones.

Clause 25. A non-transitory computer readable storage medium storing one or more programs, the one or more programs comprising instructions, which when executed by an electronic device, cause the electronic device to perform the method of any of clauses 12 to 24.

Clause 26. An electronic device, comprising: a camera; a display; one or more processors; and memory storing one or more programs to be executed by the one or more processors, the one or more programs comprising instructions that, when executed by the one or more processors, cause the electronic device to perform the method of any of claims 12 to 24.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives.

Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method performed at a display assistant device, the method comprising:
   while the display assistant device is operating in a monitoring mode:
      performing a first operation associated with a first device function, the first operation comprising:
         continuously capturing first video using a camera of the display assistant device; and
         transmitting the first video to a remote server system;
      while performing the first operation, receiving a user request to switch from the monitoring mode to an assistant mode; and
      in response to receiving the user request:
         capturing one or more images of a field of view using the camera;
         comparing the one or more images against a database comprising images of authorized users; and
         responsive to determining that there is a match between the one or more images and the images of the authorized users, switching from the monitoring mode to the assistant mode.

2. The method of claim 1, further comprising:
   pausing the first operation; and
   responsive to determining that the user request is completed, resuming the first operation.

3. The method of claim 1, wherein the user request is a first user request, the method further comprising:
   receiving a second user request; and
   responsive to determining that the second user request is associated with the first device function, denying the second user request.

4. The method of claim 1, further comprising:
   displaying an indication of playback of the first video on a client device.

5. The method of claim 1, wherein the user request is a first user request, the method further comprising:
   receiving a second user request associated with a second device function; and
   in response to receiving the second user request:
      pausing the first operation; and
      performing a second operation associated with the second device function, the second operation comprising:
         continuously capturing second video using the camera; and
         transmitting the second video to one or more second users participating in a video communication with a first user of the display assistant device.

6. The method of claim 5, wherein the camera includes a field of view, the method further comprising:
   prior to performing the first operation, changing the field of view from a first setting to a second setting.

7. The method of claim 6, further comprising:
   after pausing the first operation and prior to performing the second operation, changing the field of view from the second setting to the first setting.

8. The method of claim 1, wherein the display assistant device includes a physical button; and the user request includes a user selection of the physical button.

9. The method of claim 1, further comprising:
   responsive to determining that there is not a match between the one or more images and the images of the authorized users, continuing operating in the monitoring mode.

10. The method of claim 1, wherein the database includes hierarchy information of the authorized users; and the switching from the monitoring mode to the assistant mode is in accordance with a determination that the user matches a threshold hierarchy.

11. The method of claim 1, wherein the display assistant device includes a physical button, the method further comprising:
    receiving a user selection of the physical button; and
    in response to the user selection, disabling the camera and one or more microphones of the display assistant device.

12. The method of claim 1, wherein the display assistant device includes one or more sensors that are configured to detect one or more events, the one or more events associated with at least one of: smoke, motion, sound, and person, the method further comprising:
    responsive to a detection of a first alert event occurring in front of the camera:
       automatically enabling the camera and one or more microphones of the display assistant device; and
       recording the first alert event.

13. The method of claim 1, wherein performing the first operation includes:
    capturing, simultaneously with the first video, audio information using one or more microphones of the display assistant device.

14. A display assistant device comprising:
    a display;
    a camera;
    one or more processors; and
    a memory that stores instructions that, when executed by the one or more processors, cause the one or more processors to:
       while the display assistant device is operating in a monitoring mode:
          perform a first operation associated with a first device function, the first operation comprising:
             continuously capturing first video using a camera of the display assistant device; and
             transmitting the first video to a remote server system;
          while performing the first operation, receive a user request to switch from the monitoring mode to an assistant mode; and
          in response to receiving the user request:
             capture one or more images of a field of view using the camera;
             compare the one or more images against a database comprising images of authorized users; and
             responsive to determining that there is a match between the one or more images and the images of the authorized users, switch from the monitoring mode to the assistant mode.

15. The display assistant device of claim 14, wherein the instructions further cause the one or more processors to:
responsive to determining that there is not a match between the one or more images and the images of the authorized users, continue operating in the monitoring mode.

16. The display assistant device of claim 14, further comprising:
one or more sensors configured to detect one or more events, the one or more events associated with at least one of: smoke, motion, sound, and person; and
one or more microphones;
wherein the instructions further cause the one or more processors to:
responsive to a detection of a first alert event occurring in front of the camera:
automatically enable the camera and the one or more microphones; and
record the first alert event using the camera and the one or more microphones.

17. The display assistant device of claim 14, wherein the user request is a first user request, wherein the instructions further cause the one or more processors to:
while performing the first operation, receive a second user request associated with a second device function; and
in response to receiving the second user request:
pause the first operation; and
perform a second operation associated with the second device function, the second operation comprising:
continuously capturing second video using the camera; and
transmitting the second video to one or more second users participating in a video communication with a first user of the display assistant device.

18. A non-transitory computer-readable storage medium encoded with instructions that, when executed by one or more processors of a display assistant device, cause the one or more processors to:
while the display assistant device is operating in a monitoring mode:
perform a first operation associated with a first device function, the first operation comprising:
continuously capturing first video using a camera of the display assistant device; and
transmitting the first video to a remote server system;
while performing the first operation, receive a user request to switch from the monitoring mode to an assistant mode; and
in response to receiving the user request:
capture one or more images of a field of view using the camera;
compare the one or more images against a database comprising images of authorized users; and
responsive to determining that there is a match between the one or more images and the images of the authorized users, switch from the monitoring mode to the assistant mode.

19. The non-transitory, computer-readable storage medium of claim 18, wherein the user request is a first user request, and wherein the instructions further cause the one or more processors to:
receive a second user request associated with a second device function; and
in response to receiving the second user request:
pause the first operation; and
perform a second operation associated with the second device function, the second operation comprising:
continuously capturing second video using the camera; and
transmitting the second video to one or more second users participating in a video communication with a first user of the display assistant device.

20. The non-transitory, computer-readable storage medium of claim 18, wherein the instructions further cause the one or more processors to:
responsive to a detection of a first alert event occurring in front of the camera:
automatically enable the camera and one or more microphones of the display assistant device; and
record the first alert event using the camera and the one or more microphones.

* * * * *